United States Patent
Andersen

(10) Patent No.: US 9,561,971 B2
(45) Date of Patent: Feb. 7, 2017

(54) ELECTRODIALYSIS UNIT FOR WATER TREATMENT

(75) Inventor: Aage Bjorn Andersen, Drammen (NO)

(73) Assignee: OCEANSAVER AS, Drammen (NO)

( * ) Notice: Subject to any disclaimer, the term of this patent is extended or adjusted under 35 U.S.C. 154(b) by 366 days.

(21) Appl. No.: 13/980,022

(22) PCT Filed: Jan. 13, 2012

(86) PCT No.: PCT/EP2012/050515
§ 371 (c)(1),
(2), (4) Date: Sep. 30, 2013

(87) PCT Pub. No.: WO2012/098059
PCT Pub. Date: Jul. 26, 2012

(65) Prior Publication Data
US 2014/0021052 A1    Jan. 23, 2014

(30) Foreign Application Priority Data
Jan. 17, 2011    (GB) .................................. 1100769.7

(51) Int. Cl.
| | | |
|---|---|---|
| *C02F 1/469* | (2006.01) | |
| *B01D 61/46* | (2006.01) | |
| *C02F 103/00* | (2006.01) | |
| *C02F 1/461* | (2006.01) | |

(52) U.S. Cl.
CPC ............. *C02F 1/4693* (2013.01); *B01D 61/46* (2013.01); *B01D 2313/105* (2013.01); *B01D 2313/345* (2013.01); *C02F 2001/46133* (2013.01); *C02F 2103/008* (2013.01); *C02F 2201/004* (2013.01);
(Continued)

(58) Field of Classification Search
CPC ......... B01D 61/44; B01D 61/46; B01D 61/50; C02F 1/4693
See application file for complete search history.

(56) References Cited

U.S. PATENT DOCUMENTS

| | | |
|---|---|---|
| 2,416,273 A | 2/1947 | Wallis et al. |
| 3,075,908 A | 1/1963 | Kollsman |
| 3,135,674 A * | 6/1964 | Ruetschi ....................... 204/520 |

(Continued)

FOREIGN PATENT DOCUMENTS

| | | |
|---|---|---|
| CN | 1372998 | 10/2002 |
| CN | 101033087 A | 9/2007 |

(Continued)

OTHER PUBLICATIONS

Search Report in GB1100771.3, (May 17, 2011) 2 pages.
(Continued)

*Primary Examiner* — Keith Hendricks
*Assistant Examiner* — Salil Jain
(74) *Attorney, Agent, or Firm* — Rothwell, Figg, Ernst & Manbeck PC

(57) ABSTRACT

An electrodialysis unit 8 comprises a plurality of cathodes 68, a plurality of anodes 70 and a plurality of membranes 71; wherein the cathodes 68 and anodes 70 are arranged alternately in an electrode stack, with membranes 71 in between each cathode 68 and anode 70; and wherein the cathode 68 and the anode 70 are each formed of a single conductive plate such that both surfaces of the cathode plates and anode plates enclosed within the electrode stack are, in use, in conductive contact with the water being treated.

20 Claims, 8 Drawing Sheets

(52) U.S. Cl.
CPC ....... *C02F 2201/4611* (2013.01); *Y10T 156/10* (2015.01)

(56) References Cited

U.S. PATENT DOCUMENTS

| | | | |
|---|---|---|---|
| 3,149,062 A | | 9/1964 | Gottschal et al. |
| 3,223,606 A | | 12/1965 | Chen |
| 3,318,795 A | * | 5/1967 | Mintz et al. ................. 204/639 |
| 3,878,086 A | | 4/1975 | Haswell et al. |
| 4,067,794 A | * | 1/1978 | Ganzi ....................... C25B 9/20 204/627 |
| 4,233,146 A | | 11/1980 | Rothmayer et al. |
| 4,539,088 A | | 9/1985 | Kaneda et al. |
| 4,752,373 A | * | 6/1988 | Korngold ..................... 204/638 |
| 4,976,832 A | | 12/1990 | Boateng |
| 5,474,662 A | | 12/1995 | Miyamae |
| 6,841,058 B2 | | 1/2005 | Culvey et al. |
| 7,459,088 B2 | | 12/2008 | Davis |
| 7,776,224 B2 | | 8/2010 | Okamoto et al. |
| 2004/0031759 A1 | | 2/2004 | Richard |
| 2005/0183956 A1 | * | 8/2005 | Katefidis ..................... 204/520 |
| 2008/0128362 A1 | | 6/2008 | Babaev |
| 2008/0185294 A1 | | 8/2008 | Cai et al. |
| 2009/0229981 A1 | | 9/2009 | Desanto |
| 2009/0321260 A1 | | 12/2009 | Andersen |
| 2010/0059382 A1 | | 3/2010 | Sun et al. |
| 2011/0086291 A1 | * | 4/2011 | Valk ....................... B01D 61/50 429/498 |

FOREIGN PATENT DOCUMENTS

| | | | |
|---|---|---|---|
| CN | 101193824 A | | 6/2008 |
| DE | 3238280 A1 | | 4/1986 |
| DE | 39 26 642 A1 | | 3/1990 |
| DE | 3926642 A1 | | 3/1990 |
| DE | 19945978 A1 | | 8/2001 |
| EP | 0347016 A2 | | 12/1989 |
| GB | 1030090 | | 5/1966 |
| GB | 2315428 A | | 2/1998 |
| JP | S57174106 A | | 10/1982 |
| JP | 59154187 A | | 9/1984 |
| JP | 61114704 A | | 6/1986 |
| JP | HEI 06339683 A | | 12/1994 |
| JP | 2003512918 A | | 4/2003 |
| JP | 2004055276 A | * | 2/2004 |
| KR | 200892572 A | | 10/2008 |
| RU | 2132721 C1 | | 7/1999 |
| WO | WO 0117909 A1 | | 3/2001 |
| WO | 2007145785 A1 | | 12/2007 |
| WO | 2008047084 A2 | | 4/2008 |
| WO | 2009116855 A1 | | 9/2009 |

OTHER PUBLICATIONS

Office Action issued in U.S. Appl. No. 13/979,946, 16 pages (May 20, 2015).
Office Action and Written Opinion for Singapore Office Action for 201305452-3 dated Jun. 4, 2014, 8 pages.
Office Action issued in Chinese Patent Application No. 201280013565.2, 6 pages (Sep. 29, 2014).
Office Action issued in Russian Patent Application No. 201391039/31 with English translation, 4 pages (Jul. 17, 2015).
Non-final Office Action issued in U.S. Appl. No. 13/980,021, 67 pages, (Jul. 30, 2015).
Final Office Action issued in U.S. Appl. No. 13/979,935, 24 pages (Jul. 31, 2015).
Notice of Reasons for Rejection (and English Translation) issued in Japanese Patent Application No. 2013-548854, 7 pages (Oct. 27, 2015).
Final Office Action issued in U.S. Appl. No. 13/979,946, 20 pages (Nov. 12, 2015).
Non-final Office Action issued in U.S. Appl. No. 13/979,946, 34 pages (Apr. 6, 2016).
Notice of Allowance issued in U.S. Appl. No. 13/979,935, 41 pages (Jan. 25, 2016).
Notice of Allowance issued in U.S. Appl. No. 13/980,021, 42 pages (Jan. 14, 2016).
Advisory Action issued in U.S. Appl. No. 13/979,946, 9 pages (Feb. 1, 2016).

* cited by examiner

ELECTRODIALYSIS UNIT FOR WATER TREATMENT

CROSS-REFERENCE TO RELATED APPLICATION(S)

This application is a 35 U.S.C. §371 National Phase Entry Application from PCT/EP2012/050515, filed Jan. 13, 2012, designating the United States, which claims priority to British Application No. GB11007697 filed Jan. 17, 2011. The disclosures of these applications are incorporated by reference herein in their entirety.

The present invention relates to the treatment of water by electrodialysis, such as a treatment in order to kill micro-organisms, preferably treatment of sea water such as ballast water treatment.

Ballast water is water transported by ships in the ballast water tanks or sometimes in other suitable spaces such as in cargo holds or in cargo tanks. It is pumped into the tanks at a water "donor" location to compensate for the changing of point of gravity as cargo and/or fuel is discharged/consumed and hence to maintain stability. Correct ballasting is essential from a structural point of view and also used for performance reasons in order to ensure proper propeller and rudder immersion, proper bridge view as well as maintaining desired vessel movement and handling characteristics. The ballast water is transported to a water "recipient" location, generally at a point where the vessel is to be loaded with cargo, which is potentially outside the bio-geographic region of that of the ballast water origin. It may then be discharged as cargo is taken onboard. Ballast water may host a range of species including zooplankton, phytoplankton, bacteria and viruses. These may not have natural predators at the point of discharge and may establish and reproduce at the new location causing significant problems for the environment, industry and human health.

It is desirable to treat water and particularly ballast water in order to kill or disable micro-organisms and to reduce or remove other pollutants.

WO 2008/047084 describes a method and apparatus for ballast water treatment including the use of electrodialysis in a membrane cell. Electrodialysis of this type is a fluid treatment process based on ion-separation by applying an electric potential difference, either constant or in pulses, between two electrodes separated by an ion-exchange membrane. One electrode will perform as an anode (positive charge) attracting negatively charged ions whilst the other will perform as a cathode (negative charge) attracting positive charged ions. The fluid in the compartment between the membrane and the anode will become characterised by negatively charged ions with an excess of electrons and may be referred to as the concentrate while the fluid in the compartment between the membrane and the cathode will be characterised by the presence of positive ions with a shortage of electrons and may be referred to as the diluate.

In some electrodialysis processes, multiple membrane cells are arranged into a configuration called an electrodialysis stack, with alternating anion and cation exchange membranes forming the multiple membrane cells, generally between a single anode and cathode. Known uses of electrodialysis are large scale brackish and seawater desalination and salt production, and small and medium scale drinking water production. Electrodialysis is also used in the process industry for separation of certain contaminants such as heavy metals.

In the disclosure of WO 2008/047084 ballast water is treated by separating a part of the ballast water from the main flow, passing it through the membrane cell, and returning a product of the membrane cell to the main flow. The returned product is mainly concentrate and this has the effect of disabling or killing micro-organisms in the water. The concept of directing only a part of the water through the electrodialysis treatment unit and returning a product of the membrane cell to the water represented an advance in the art, since an effective water treatment is achieved without the need to pass the entire water flow through the electrodialysis treatment unit.

Thus, the electrodialysis device of WO 2008/047084 provides an advantageous form of electrodialysis treatment for use with water treatments such as ballast water treatment. However, further work in relation to the use of an electrodialysis treatment of this type to treat seawater such as ballast water has identified areas where improvements may be made.

The claims of this application relate to the fourth to sixth aspects below. The other aspects set out below are not presently claimed herein and are included to explain other related inventions.

Viewed from a first aspect, the present invention provides an electrodialysis unit comprising: a cathode, an anode, a membrane between the cathode and the anode, a cathode flow path for water flow along the membrane on the cathode side, an anode flow path for water flow along the membrane on the anode side, and a reaction zone formed between the membrane and the cathode where the cathode faces the anode, wherein the cathode flow path is arranged for laminar flow in the reaction zone and wherein the electrodialysis unit comprises flow conditioning elements arranged to promote laminar flow in the incoming water flow to the cathode flow path.

Sea water is not purely a solution of water with sodium chloride but instead includes other salts and compounds that result in secondary reactions in addition to the well known sodium chloride and water reactions. For example, magnesium salts can form about 3-4% of the salts in sea water. One of the secondary reactions has been found to produce brucite, $Mg(OH)_2$, on the cathode side of the electrodialysis unit. Brucite has the appearance of a milky white sticky substance. Unexpectedly, the inventors have found that when normal seawater is used the electrodialysis process forms this brucite substance in the electrodialysis unit and that brucite deposits build up in internal flow channels. This problem is not disclosed in the known prior art. The electrodialysis unit of this aspect includes features to address this new problem.

Typically, conventional electrodialysis units will seek to promote turbulence and secondary flows, since this mixing process is thought to aid the electrodialysis reactions and accelerate ion transport across the membrane. Hence, conventionally laminar flow is not used and no measures are taken in the known devices to ensure laminar flow on the cathode side. The present arrangement is based on the realisation that brucite deposits are a potential problem and that by including structures to promote laminar flow the build-up of brucite can be avoided. The formation of brucite deposits is aided by turbulence and uneven or secondary flows in conventional electrodialysis units. With these flow patterns dead spots or zones of recirculating water flow form, where the brucite becomes trapped. This allows the brucite to agglomerate or coagulate and build into larger deposits.

Secondary flow structures do not occur if the flow is laminar. By incorporating features intended to promote laminar flow before the water enters the reaction zone the electrodialysis unit of this aspect reduces the opportunity for agglomeration or coagulation of brucite and other contaminants that may be formed in the reaction zone. Maintaining the laminar flow through the reaction zone reduces the opportunity for contaminants to become trapped or stuck within the device. The reaction zone is the region of the electrodialysis unit where the anode and cathode overlap sufficiently for the electrodialysis reaction to occur. When the formation of brucite deposits is avoided the unit requires less frequent cleaning. The build-up of other contaminants can also be reduced.

Preferably, the flow conditioning elements are arranged to promote laminar flow in an area preceding the reaction zone. The cathode flow path in the reaction zone may be a straight-sided flow path of generally constant dimensions. Areas in the flow path of varying shape and size are preferably outside of the reaction zone, and preferably spaced away from the reaction zone.

Preferably the cathode flow path is free from obstructions in the reaction zone. This avoids the generation of turbulence, which would otherwise occur when water flows about an obstruction. Generally, an electrodialysis unit will incorporate spacer elements to maintain a desired spacing between the membrane and the electrodes. In the prior art, these spaces are present on both the anode side and the cathode side to keep the membrane in position. Preferably the electrodialysis unit of this aspect has no spacer element on the cathode side, i.e. spacer elements may be included only on the anode side of the ion-exchange membrane. This avoids any obstruction from spacer elements on the cathode side and hence reduces turbulence on the cathode side. Since the brucite reaction does not occur on the anode side no problem arises from the presence of a spacer element generating turbulence in the anode flow path.

In a preferred embodiment the unit is arranged such that there is a greater flow rate through the cathode flow path than through the anode flow path. This is in order to provide a higher pressure on the cathode side of the membrane. Hence, preferably there is a greater flow velocity through the cathode flow path than through the anode flow path. The flow volume through the cathode flow path may also be larger than the flow volume through the anode flow path. The higher pressure through the cathode flow path acts to push the membrane away from the cathode, which can reduce the opportunity for build-up of brucite deposits on the membrane. Moreover, the use of a higher flow rate, especially in combination with the laminar flow of this aspect, acts to wash away any brucite deposits that may occur. A water inlet for the cathode flow path(s) may be larger than a water inlet for the anode flow path(s). If water is supplied at the same pressure to both inlets then this would result the required increased flow rate and the flow velocity and flow volume would both be higher if the cathode flow path(s) has the same cross-sectional area as the anode flow path(s).

The electrodialysis unit may include flow conditioning elements prior to the reaction zone to promote even distribution of incoming water across the widths of the cathode flow path and/or anode flow path. In the preferred embodiment the cathode and anode flow paths are formed between plate shaped electrodes and hence will have an elongate slot shaped cross-section. A narrow slot shaped cross-section for the flow path can promote laminar flow. For example, the cross-sections of the flow paths may be slots with a width of between 1 mm and 4 mm, preferably a width of about 2 mm between the electrode and the membrane. The cross-sections of the cathode flow path and the anode flow path may be slots having the same width. Flow conditioning elements used to ensure an even distribution of incoming water across the width of a slot shaped cross-section will promote laminar flow.

The flow conditioning elements may comprise channels, baffles and/or guide vanes for even distribution of flow from one or more water inlet passages to the anode/cathode flow path. The incoming water flow is preferably divided evenly across the width of the anode/cathode flow path. In a particularly preferred embodiment the flow conditioning elements comprise flow channels extending in a fan shape from an inlet passage to the cathode/anode flow path.

The preferred embodiment utilises multiple repeated cathode and anode plates arranged in layers in an electrode stack, with membranes in between each cathode and anode. This enables multiple electrodialysis chambers to be formed in parallel, each with their own electrodes, and this increases the rate at which water can be treated. Preferably, the electrodialysis unit comprises a repetition of the sequence cathode plate, membrane, anode plate, membrane, such that both sides of each electrode plate are utilised (aside from electrodes at the outer ends of the repeated sequence). Thus, each cathode plate in the central portion of the electrode stack would have a cathode flow path on each side of the plate. Similarly each anode plate would have an anode flow path on each side.

In order to reduce disruption as the water flows into the electrode flow paths after the flow conditioning elements, the leading edge of the cathode and/or anode preferably comprises a shaped end with increasing width. The shaped end may for example include a wedge shape and/or curved portion. After the shaped end, the cathode/anode preferably takes the form of a plate with constant width. A preferred shape for the shaped end is a symmetrical wedge shape with a rounded point. The use of a shaped end acts to gently divide the flow along either side of the electrode. Where the electrodialysis unit comprises spacer elements in the anode flow path these spacer elements are preferably located after the shaped end.

The shaped end of the cathode and/or anode may be formed by shaping the electrode material, e.g. by machining. Alternatively, the shaped end may be formed by the addition of a shaped component formed of a different material. This is advantageous when the electrode material is difficult and/or costly to shape. For example, if a titanium electrode is used. The shaped end may be a moulded plastic insert.

Preferably the electrodialysis unit is arranged such that the reaction zone does not begin until water has flowed a predetermined distance along the cathode. This is to promote laminar flow in the cathode flow path through the reaction zone. In a preferred embodiment this is achieved by the cathode being placed in the water flow path with the leading edge of the cathode at a shorter distance from the inlet than the leading edge of the anode. With this arrangement the water flow across the cathode plate has an opportunity to settle before the reaction zone, since the electrical reaction will not commence until the flow reaches an area where the anode and the cathode are sufficiently close together. For example, the leading edge of the cathode may be placed between 20 mm and 60 mm closer to the water inlet than the leading edge of the anode. In the preferred embodiment the leading edge of the cathode is placed about 30 mm closer to the water inlet than the leading edge of the anode.

The incoming water may be permitted to flow a predetermined distance without disturbance after the end of the flow conditioning elements and before the water reaches the cathode or the anode. This undisturbed flow helps the water recover from any disruptive effects arising from the previous the flow conditioning elements or from the termination of those flow conditioning elements. For example, the water may flow undisturbed for at least 5 mm before reaching the leading edge of the cathode or the anode, preferably at least 10 mm. The greater the distance, the more opportunity there is for the flow to settle into a laminar flow pattern. However, typically there will be a point where increasing the distance does not provide a corresponding increase in the uniformity of the flow pattern. With a slot width of about 2 mm good results have been seen when the water flows undisturbed for about 10 mm before it reaches the leading edge of the cathode or the anode. When the electrodialysis unit is formed of repeated cathode and electrode plates separated by membranes the area of undisturbed flow may be formed as an undisturbed flow path in a space between two membranes, this undisturbed flow path extending for the predetermined distance between the membranes before the water reaches the leading edge of cathode or the anode located between the two membranes.

Where the electrodialysis unit includes a layered electrode stack as described above the electrodialysis unit preferably includes a flow distribution system for distributing the incoming water to each electrode chamber in equal amounts. Hence, the electrodialysis unit may include a cathode flow distribution system for distributing incoming water equally to each cathode water inlet and an anode flow distribution system for distributing incoming water equally to each anode water inlet. As noted above, the cathode flow paths may receive a greater flow rate of water than the anode flow paths. The cathode flow distribution system ensures that the cathode flow paths and at each of the multiple cathodes are supplied with a equal water flow. The anode flow paths are similarly supplied with a equal water flow.

The flow distribution system in a particularly preferred embodiment takes the form of an inlet manifold for the anode flow paths and/or cathode flow paths wherein the inlet manifold comprises a first tube provided with holes along its length, the holes being connected to the flow paths, and a second tube located within and enclosed by the first tube, the second tube having an inlet at one end and being closed at its second end and the second tube being provided with holes along its length that open into the first tube. Further features of a preferred inlet manifold are discussed below.

Viewed from a second aspect the invention provides a method comprising use of the electrodialysis unit described above for the treatment of sea water, preferably use for treatment of ballast water.

Viewed from a third aspect the invention provides a method of manufacturing an electrodialysis unit comprising the steps of: providing a cathode, an anode, a membrane between the cathode and the anode, a cathode flow path for water flow along the membrane on the cathode side, an anode flow path for water flow along the membrane on the anode side, and a reaction zone formed between the membrane and the cathode where the cathode faces the anode; arranging the cathode flow path for laminar flow in the reaction zone; and arranging flow conditioning elements in an area of incoming water flow to promote laminar flow in the incoming water flow preceding the reaction zone.

The method may comprise providing features of the electrodialysis unit as set out above in relation to preferred features of the first aspect.

Viewed from a fourth aspect the present invention provides an electrodialysis unit comprising: a plurality of cathodes, a plurality of anodes and a plurality of membranes; wherein the cathodes and anodes are arranged alternately in an electrode stack, with membranes in between each cathode and anode; and wherein the cathode and the anode are each formed of a single conductive plate such that both surfaces of the cathode plates and anode plates enclosed within the electrode stack are, in use, in conductive contact with the water being treated.

In conventional electrodialysis units of this type the electrodes are made from two pieces of titanium that are brazed to copper rods to form a sandwich. These copper rods then extend out of the electrodialysis unit and are used to provide connections to the main electrical supply. In the electrodialysis unit of this aspect a single conductive plate is used for each electrode. As a consequence the electrodialysis unit can be made smaller and more compact. In addition, since the conductive material is typically relatively expensive, the reduction in the number of plates used leads to cost savings. Titanium is used for the anode plates and the cathode plates in preferred embodiments of the electrodialysis unit.

By a single conductive plate it is meant that the main conductive and electrically active part of the electrode is formed of a single plate, as compared to two plates as in the prior art discussed above. The electrodes may include other elements in addition to the single conductive plate, such as fixing parts, shaped end portions and so on.

The electrodes may be arranged in a continuous electrode stack to form the entire electrodialysis unit. However, this arrangement lends itself to a parallel connection of all the electrodes to the electrical supply. It can be advantageous to allow for a series connection of parts of the electrodialysis unit, for example for impedance matching with the power supply. Hence, in a preferred arrangement the electrode stack comprises multiple sets of electrodes, with each electrode in a single set connected in parallel, and each set of electrodes connected in series. For example an electrode stack made up of fifty anode chambers and fifty cathode chambers may be made up of five sets each comprising ten anode chambers and ten cathode chambers.

Within the centre parts of the electrode stack or of each set of electrode chambers, both surfaces of each conductive plate are in electrical contact with the water, so both surfaces of the electrodes are utilised as active surfaces in the electrodialysis process. The electrodialysis unit comprises a repetition of the sequence: cathode, membrane, anode, membrane, with both sides of each electrode plate being utilised, aside from the electrodes at the outer ends. The electrodes at the outer ends of each set of electrodes in the electrode stack are preferably both cathodes. The cathode can be cheaper to produce than the anode since the anode reaction requires an expensive coating for the electrode. Hence, by the use of additional cathodes as the end electrodes (for which only one side of the electrode is utilised in the reaction) the electrodialysis unit can be cheaper to produce without reducing the total reaction area.

The electrical connections for the electrodes may be made directly to the conductive material of the conductive plates. Preferably the conductive plates are allowed to extend outside of the reaction area of the electrodialysis unit to provide electrical connection points.

In a preferred embodiment, the conductive plates that form the electrodes are clamped between and supported by non-conductive separators. The separators may be for separating the fluid flow into and out of the cathode flow paths and anode flow paths. The separators may include openings exposing the conductive plates in the reaction zones. The membrane can be placed across these openings between anode and cathode to complete the membrane cell where the electrodialysis reactions occur.

The separators preferably include inlet passages for incoming water and outlet passages for outgoing diluate and concentrate. Flow guide features are also preferably incorporated in the separators, such as flow conditioning elements as discussed above in relation to the first aspect. Since the separators include flow guide features they are generally of larger size than the conductive plates.

Preferably, the conductive plates are provided with a seal that is bonded to the conductive plates and forms a shape corresponding to the shape of the separators. Since the separators are larger than the conductive plates the seal may extend beyond the edges of the conductive plates. For example, the conductive plates may be generally rectangular, and the seal may be bonded along two opposite sides of the rectangle and then extend outwardly beyond the two remaining sides of the rectangle. When the conductive plate and seal are placed between two separators the seal forms an enclosed electrode chamber. The two separators may be clamped about the conductive plate by any appropriate means, for example by a frame enclosing the electrode stack or by screws joining together each pair of separators.

The seal may be any suitable material, i.e. a resilient and water resistant material. A rubber material is preferred. Preferably, the seal comprises a rubber material. A high density rubber containing a relatively high level of filling-agent may be used.

It has been found that it may be difficult to securely attach the seal to the electrode, especially when a titanium electrode is used. In a preferred arrangement this problem is overcome by the use of a thermosetting or vulcanising rubber, which is applied to the electrode prior to heat treatment, and then bonded to the electrode by heating and optionally pressurising the rubber to perform the thermosetting or vulcanising process whilst it is in contact with the electrode. The surface of the electrode may be conditioned prior to application of the untreated rubber, for example by etching or other chemical process.

As discussed above in relation to the first aspect, preferred embodiments utilise different flow rates for the cathode and the anode. Consequently, the electrodialysis unit of this embodiment preferably incorporates alternate separator designs for the cathode and the anode. This enables different flow guide features to be used for the anode and the cathode. Also, since in the preferred embodiments the anode and cathode may have leading edges that are placed at a different distance from the respective water inlets, the different separator designs may also allow for support of the anode and cathode plates at the required positions.

In preferred embodiments the unit includes cathode chambers comprising first and second cathode separators located on either side of a cathode in the form of a conductive plate. The unit may include anode chambers comprising first and second anode separators located on either side of an anode in the form of a conductive plate. The electrodialysis unit may then be formed by a sequence of anode and cathode chambers, with membranes between each chamber.

The separators may include through holes that, when a number of electrode chambers are stacked together, form water inlet and outlet passages. There may be one or more anode inlet passage and anode outlet passage. Similarly there may be one or more cathode inlet passage and cathode outlet passage. In a preferred embodiment, to provide an increased flow rate through the cathode, there are two cathode inlet passages, one anode inlet passage, two cathode outlet passages and one anode outlet passages, each of about the same size. Seals are preferably provided about the through holes to maintain separation of the anode fluid and cathode fluids. Tubes may be passed along the through holes of all the separators in the stack to complete the inlet and outlet passages. The tubes may be inlet manifolds as described below. Advantageously, the use of tubes along through holes can also act to align the chambers in the electrode stack.

Viewed from a fifth aspect the invention provides a method comprising use of the electrodialysis unit described above for the treatment of sea water, preferably use for treatment of ballast water.

Viewed from a sixth aspect the invention provides a method of manufacturing an electrodialysis unit comprising a plurality of cathodes, a plurality of anodes and a plurality of membranes; the method comprising arranging the cathodes and anodes alternately in an electrode stack, with membranes in between each cathode and anode; wherein the cathode and the anode are each formed of a single conductive plate such that within the electrode stack both surfaces of the cathode plates and anode plates are, in use, in conductive contact with the water being treated.

The method may include providing a seal and bonding the seal to the conductive plates. In a preferred embodiment a thermosetting or vulcanising rubber is used for the seal, and the method comprises applying the rubber to the electrode prior to heat treatment, and then bonding the rubber to the electrode by heating and optionally pressurising the rubber to perform a thermosetting or vulcanising process whilst it is in contact with the electrode. The surface of the electrode may be conditioned prior to application of the untreated rubber, for example by etching or other chemical process.

Preferably, the method includes clamping the conductive plates and the seal between non-conductive separators. The two separators may be clamped about the conductive plate by any appropriate means, for example by a frame enclosing the electrode stack or by screws joining together each pair of separators.

The separators may be for separating the fluid flow into and out of the cathode flow paths and anode flow paths. The separators may include openings exposing the conductive plates in the reaction zones. Preferably, the method comprises placing membranes across these openings between anode and cathode, such that the membranes are sandwiched between adjacent electrodes.

The separators may include through holes that, when a number of electrode chambers are stacked together, form water inlet and outlet passages. There may be one or more anode inlet passage and anode outlet passage. Similarly there may be one or more cathode inlet passage and cathode outlet passage. The method preferably comprises passing tubes along the through holes of all the separators in the stack to complete the inlet and outlet passages. Advantageously, the use of tubes along the through holes can also act to align the chambers in the electrode stack.

The method may comprise steps as discussed above in relation to the third aspect. The method may comprise providing other features of the electrodialysis unit as set out above in relation to preferred features of the first or fourth aspect.

Viewed from a seventh aspect the invention provides an electrodialysis unit comprising: a plurality of cathodes, a plurality of anodes and a plurality of membranes; the cathodes and anodes being arranged alternately in an electrode stack, with membranes in between each cathode and anode, anode flow paths formed between the membranes and anodes and cathode flow paths formed between the membranes and cathodes; the electrodialysis unit further comprising an inlet manifold for distributing water to the anode flow paths or to the cathode flow paths, wherein the inlet manifold comprises a first tube provided with holes along its length, the holes being connected to the flow paths, and a second tube located within and enclosed by the first tube, the second tube having an inlet at one end and being closed at its second end and the second tube being provided with holes along its length that open into the first tube.

By the use of this arrangement of nested tubes, water can be evenly distributed to all flow paths along the electrode stack. In use, water may flow through the inlet of the second tube, into and along the second tube, out of the holes of the second tube into the first tube, and thereafter out of the first tube into the electrode stack. This water path and the flow restrictions from the holes act to maintain a generally constant pressure along the length of the electrode stack and hence water is supplied evenly to all the anode/cathode flow paths.

The inlet manifold may be provided only for the cathode or only for the anode, but preferably similar inlet manifolds are provided for both the cathode and the anode. As discussed above, it is advantageous to have a higher flow rate through the cathode flow paths than through the anode flow paths. Therefore, preferably the electrodialysis unit comprises an inlet manifold for the cathode flow paths that is arranged for a higher flow rate than the inlet manifold for the anode flow paths. This may be achieved by a larger manifold. Preferably however the unit comprises two parallel inlet manifolds for the cathode flow paths, supplying water in parallel to the flow paths. When there is just one similar inlet manifold for the anode flow paths, this enables approximately double the flow rate for the cathode flow paths compared to the anode flow paths.

The tubes of the manifold are preferably circular. A circular tube is easy to obtain and/or manufacture, and in addition it is straightforward to form holes for mount a circular manifold. However, the tubes of the inlet manifold are not limited to circular tubes and could for example be tubes with a rectangular cross-section or another tube shape.

The holes of the first tube preferably connect to the flow paths via flow guides, for example flow conditioning elements as discussed above. The holes of the first tube may take the form of slits located transversely across the tube.

The holes of the second tube may be slits located transversely across the tube. The second tube may have holes on a first side facing the holes of the first tube. There may also be additional holes on the opposite side.

Preferably the second tube is located within the first tube at a central location, i.e. the first and second tube may be concentric.

In a preferred embodiment, the anodes and cathodes are supported by separators and the separators are provided with through holes, wherein the inlet manifold is located along through holes in the separators and preferably wherein the holes in the first tube open into flow guide features formed in the separators. The first tube may be a tube formed by alignment of through holes in the separators. The second tube may be a pipe inserted into the first tube.

In preferred embodiments, the electrodialysis unit has features as discussed above in connection with the first or fourth aspects.

Viewed from an eighth aspect the invention provides a method comprising use of the electrodialysis unit described above for the treatment of sea water, preferably use for treatment of ballast water.

Viewed from a ninth aspect the invention provides a method of manufacturing an electrodialysis unit comprising: a plurality of cathodes, a plurality of anodes and a plurality of membranes; the cathodes and anodes being arranged alternately in an electrode stack, with membranes in between each cathode and anode, anode flow paths formed between the membranes and anodes and cathode flow paths formed between the membranes and cathodes; the method comprising providing an inlet manifold for distributing water to the anode flow paths or to the cathode flow paths, wherein the inlet manifold comprises a first tube provided with holes along its length, and a second tube having an inlet at one end and being closed at its second end and the second tube also being provided with holes, the method further comprising providing the first tube in the electrode stack so that the holes of the first tube connect to the flow paths and locating the second tube within the first tube so that the second tube is within and enclosed by the first tube and the holes of the second tube open into the first tube.

In a preferred embodiment, the anodes and cathodes are supported by separators and the separators are provided with through holes, the method comprising providing the inlet manifold in the electrode stack along through holes in the separators.

The method may comprise steps as discussed above in relation to the third or sixth aspect. The method may comprise providing other features of the electrodialysis unit as set out above in relation to preferred features of the first or fourth aspect.

Viewed from a tenth aspect the invention provides an electrodialysis unit for treating water comprising: a membrane cell, a temperature monitoring device for monitoring the temperature of incoming water and a heater for increasing the temperature of the incoming water before it reaches the membrane cell, wherein the heater is arranged to operate to increase the temperature of the incoming water when the original water temperature is below a predetermined level.

It has been found that a temperature of the incoming water below a certain level leads to a significant increase in electrical power required to drive the electrodialysis unit. This increase in power can be less than the power required to heat the water. Hence, the efficiency of the system is improved by heating the water when the original temperature is too low.

The electrodialysis unit is preferably for the treatment of sea water, more preferably for treatment of ballast water. The electrodialysis unit may be for installation on a vessel such as a ship.

The heater may be an electrically powered heater or a fuel heater. Preferably however the heater is powered by waste heat, which may for example be provided by waste heat from an engine cooling system or by heat recovered from an engine exhaust. This further improves the efficiency. The heater may include a heat exchanger or similar device.

In a preferred embodiment the heater is operated to increase the temperature of the incoming water when the original temperature is below 10° C., more preferably when the original temperature is below 15° C. and yet more preferably when the temperature is below 16° C. It has been found that for sea water a significant increase in power usage occurs when the temperature drops below 16° C. Preferably the water is heated to above 16° C., more preferably to at least 18° C. and optionally to 20° C. or above. It has been found that for sea water there are no significant reductions in power usage for temperatures in excess of about 20° C.

Viewed from an eleventh aspect the invention provides a method of treating water by electrodialysis using a membrane cell, the method comprising: monitoring the temperature of incoming water and increasing the temperature of the incoming water before it reaches the membrane cell if the original water temperature is below a predetermined level.

Preferably the method is a method of treating sea water, more preferably a method of treating ballast water. The method may be for treatment of ballast water on board a vessel such as a ship.

The step of heating the water may use a heater. The heater may be an electrically powered heater or a fuel heater. Preferably however the method comprises heating the water by using heat, which may for example be provided by waste heat from an engine cooling system or by heat recovered from an engine exhaust.

A preferred embodiment comprises increasing the temperature of the incoming water when the original temperature is below 10° C., more preferably when the original temperature is below 15° C. and yet more preferably when the temperature is below 16° C. Preferably the water is heated to above 16° C., more preferably to at least 18° C. and optionally to 20° C. or above.

Viewed from a twelfth aspect the invention provides a method of manufacturing an electrodialysis unit comprising providing a membrane cell, providing a temperature monitoring device for monitoring the temperature of incoming water, and providing a heater for increasing the temperature of the incoming water before it reaches the membrane cell, the heater being arranged to operate to increase the temperature of the incoming water when the original water temperature is below a predetermined level.

The electrodialysis units and methods of the aspects and preferred embodiments described above may be combined. The electrodialysis units of the aspects and preferred embodiments described above may include one or more of the following features and/or may be incorporated in a water treatment apparatus including any of the following features.

The membrane may be any suitable membrane for use in the electrodialysis of water, such as a water impermeable ion-exchange membrane. An ion selective membrane may optionally be used, for example if the membrane cell is to be powered by AC electricity.

The electrodialysis treatment is preferably applied to only a part of the water to be treated, with this part being separated from the main body of the water and a product of the electrodialysis unit being returned to the remainder of the water to treat the entirety of the water. In a preferred water treatment apparatus the part of the water treated by the electrodialysis unit is preferably separated from the incoming water flow just prior to treatment and then passed through the electrodialysis unit as the remainder of the water passes by without being treated by the electrodialysis unit. Thus, the apparatus may include a main flow path, wherein the inlet flow path is arranged to separate a portion of the flow from the main flow path and direct it through the electrodialysis unit. Alternatively, the part of the water treated by the electrodialysis unit can be provided from a separate source, for example an external source of brine or saltwater. In both cases, the apparatus may include a connection from the outlet flow path to a main flow path, wherein the outlet flow path added the product of the electrodialysis unit to the main flow path.

The water which is not treated by the electrodialysis unit can be exposed to other treatments, effectively in parallel with the electrodialysis treatment to the said part of the water, for example a cavitation treatment or a nitrogen injection treatment as discussed in more detail below.

Preferably less than 10% by volume of the total water flow into the treatment apparatus passes through the electrodialysis unit, more preferably less than 5% and yet more preferably less than 2%. An amount of about 1.6% by volume is preferred, although depending on conditions, amounts as low as 1% or 0.5% could be used. It is possible to manipulate the necessary flow volume by altering the current used in the electrodialysis unit and the salinity of the water. Thus, depending on these factors and the particular application of the treatment, the flow volume used can be larger or smaller.

In preferred embodiments, the invention is a ballast water treatment apparatus. As discussed above, water treatment of this type is particularly desirable for ballast water. Many existing water treatments are not suitable for ballast water treatment due to the high volume of water that needs to be treated in a short space of time. As only a part of the water needs to be passed through the electrodialysis unit, with the remainder of the water not passing through the electrodialysis unit, the treatment can be applied to a much higher volume of water in a given time than alternatives which require the entirety of the water to be directly affected by an electrical treatment.

The electrodialysis unit may be for producing a diluate stream and a concentrate stream at the cathode and anode respectively, with the product of the electrodialysis unit that is returned to the water being composed of some or all of one or both of these streams. The product of the electrodialysis unit may simply be some or all of the concentrate stream produced by the electrodialysis unit. However, preferably the product of the electrodialysis unit is a mixture of some or all of the concentrate stream, ideally a major portion thereof with at least a portion of the diluate stream, ideally in a smaller amount than the amount of concentrate. The concentrate stream contains an increased content of different oxidants and the oxidants are particularly effective at killing or disabling micro-organisms in the water when the product of the electrodialysis unit is returned to the main water flow.

After the electrodialysis treatment, the concentrate may have a lower pH than the water prior to treatment, and the diluate may have a higher pH. Mixing the concentrate with some or all of the diluate allows the pH of the product of the electrodialysis unit to be adjusted.

In a preferred embodiment the concentrate stream and at least a portion of the diluate stream are mixed immediately after passing through the electrodialysis unit. This may be done by removing a portion of the diluate stream, and then mixing the remainder of the diluate with the concentrate stream. The amount of diluate removed may be between 20% and 80% by volume In alternative preferred embodiments, the product of the electrodialysis unit that is returned to the main water flow is all of the diluate stream along with all of the concentrate stream. It has been found that in some circumstances the entirety of the diluate is required to provide the desired pH and other characteristics of the final water flow after the product of the electrodialysis unit is mixed in. In this case, the diluate and the concentrate may react together to consume all oxidants and reactive products from the water. However, reactions to kill micro-organisms will also occur before all the oxidants and reactive products are consumed by reaction of the diluate and concentrate. Moreover, the electrodialysis process is not completely reversible. For example, the reaction may produce gasses such as hydrogen and chlorine which exit the water.

In order to control the mixing ratio pH is monitored and balancing is controlled to keep pH in the desired range. The pH monitoring may be by means of a pH electrode. Preferably, the pH is maintained below 6, for example within a range from 4 to 6, typically at a pH of about 5. The mixing ratio and the pH of the product of the electrodialysis unit may be controlled by varying the amount of diluate added to the concentrate, for example by varying the amount of diluate removed prior to mixing. Control of the pH may also occur by controlling the current or voltage supplied to the electrodialysis unit, to thereby vary the strength of the resultant electrodialytic effect and hence vary the oxidative strength of the concentrate.

The apparatus may include a diluate removal flow path for removing a part of the diluate stream. To facilitate mixing of the concentrate and non-removed diluate the apparatus may include a mixing area prior to the outlet flow path. In one preferred embodiment, the mixing area is a buffer tank. Alternatively, the concentrate and diluate may be mixed as they flow through the outlet flow path. Mixing may occur at the same time as the concentrate stream and non-removed part of the diluate stream are mixed with the main flow, i.e. the product of the electrodialysis unit may consist of two parts which are only mixed when these two parts are mixed with the rest of the water. Mixing may be promoted by a static mixer or turbulence inducing means in the mixing area or in the outlet flow path.

The removed diluate may be re-injected to the water upstream prior to the electrodialysis unit. If other treatment stages are included in a water treatment apparatus, such as a cavitation treatment or filtration treatment then the remainder of the diluate is preferably re-injected prior to other treatment stages and even prior to the ballast pump. Re-injecting the diluate avoids the need to dispose of it. The diluate will also advantageously act as a cleaning agent, in particular for the filtering processes if it is injected prior to filtering.

The characteristics and amounts of concentrate and diluate reinjected into the main flow may be controlled by monitoring Oxygen Reduction Potential (ORP) and/or the consumption of Total Residual Oxidant (TRO). The ranges for desired values of ORP may be 250-800 mV, more preferably 300-500 mV. The immediate initial values of TRO following reinjection is preferably between 1 and 10 mg Cl/L more preferably between 2 and 5 mg Cl/L dropping rapidly to 0.01-1 mg Cl/L after a period of 1 to 36 hours typically. The consumption of TRO is strongly dependent upon the characteristics of the water to be treated. To optimise the performance of the electrodialytic unit, it is desirable to arrange a calibration flow loop allowing presetting of current and mixing ratios prior to initiating actual water treatment. When the ORP and/or TRO measured values are outside the desired ranges, then the operation of the electrodialysis unit is adjusted accordingly.

To direct the water flow, the apparatus may comprise conduits, pipes, baffles and the like. The electrodialysis unit may be integrated into a flow path for the main water flow, and thus the apparatus may include a main flow pipe or conduit for the main flow, with smaller pipes or conduits or the like for channelling a part of the main flow through the unit. Alternatively, the electrodialysis unit may be provided as a standalone unit which can be connected to an existing water conduit to treat the water therein. In this case, the treatment apparatus may include suitable pipes or conduits for connection of the standalone unit to the existing conduit, along with valves, dosage pump(s) and so on as required.

An independent source of brine may be used to augment the input electrolyte for the electrodialysis unit and increase its salinity. This might for example be brine produced as a by-product of freshwater production or in a dedicated brine production plant, such as a reverse osmosis plant. A recirculating reverse osmosis plant may be used to generate a saturated brine solution for use as an addition to the input electrolyte. The addition of brine or the like is required when the system is used to treat fresh water or weakly brackish water, as otherwise the electrical treatment will not be effective due to a lack of ions in the water. Brine may be also added to sea water with a low salt content in order to bring the salt content of the electrolyte to a more preferred level. At lower salt contents a larger electrical current is required to achieve the same treatment effect with the electrodialysis unit. Consequently, by increasing the salt content a reduction in energy usage can be obtained. As an example, in the North Sea a salinity of 25 parts per thousand or higher is typical, whereas in the Baltic Sea surface waters have a much lower salinity, of perhaps 7 parts per thousand. Preferably, brine is added to the input electrolyte to the electrodialysis unit to maintain a salinity of at least 25 parts per thousand.

Preferably, the water is stored for a period of time in a reservoir or tank after treatment. This allows time for the oxidants and reactive substances from the product of the electrodialysis unit to have full effect on any micro-organisms and other unwanted matter in the water. In a particularly preferred embodiment, the invention is used in ship's ballast water treatment, wherein the water is treated as it is taken in to the ballast tanks, and then it is stored in the ballast tanks before discharge. In this circumstance there is generally a reasonable time of storage as the ship moves from port to port before re-loading with cargo and discharging the ballast water. This time can be advantageously put to use in allowing the treatment by the product of the electrodialysis unit to take effect.

The treatment flow path may be formed by a conduit external to the main flow path. This allows an existing water flow path to be easily adapted to include the treatment apparatus by the addition of an appropriate inlet and outlet junction. Alternatively, the treatment flow path may be integrated with the main flow path as a single unit.

The water treatment apparatus may optionally include a gas injection unit for injecting nitrogen gas into the water prior to or at the same time as the product of the electrodialysis unit is returned to the water. In some cases, it is preferred to inject the nitrogen immediately after the product of the electrodialysis unit is returned to the water. The nitrogenation of the water is thought to prolong the oxidant treatment, and also has a beneficial corrosion reduction effect.

Nitrogen may be injected into all or a part of the water flow as discussed in WO 2008/047084. The nitrogen is preferably injected in sufficient amounts to ensure that the treated water is super-saturated with nitrogen. In a preferred embodiment, a part of the water flow is separated from the main flow, and nitrogen is injected into this part. Preferably the part of the water flow is less than 15% of the whole volume of water flow. When the nitrogenated water flow is reintroduced to the main water flow, a static mixer may be used to promote mixing of the two water flows.

The water treatment apparatus may optionally include a cavitation unit for applying a cavitation treatment to the water. The use of a cavitation unit produces a physical effect on any micro-organisms and other living and non-living matter in the water and thus breaks down these unwanted elements. Preferably, the cavitation unit is placed to treat water before the electrodialysis treatment is applied. The optional cavitation treatment can thus be used to eliminate larger and more complex organisms, as well as breaking down other unwanted matter, and in particular breaking down groups or clumps of micro-organisms. This can provide a pre-treatment for the treatment effect of the electrodialysis unit, since the damaged and broken down organism are more easily attacked by the product of the membrane cell can then provide a final level of treatment which eliminates any remaining organisms, and is able to act more effectively due to the fact that larger sized organisms and groups of organisms have been broken down.

An alternative pre-treatment or additional pre-treatment may optionally be provided by an electrical treatment unit that applies high frequency alternating electrical current to the water, the frequency being sufficiently high to physically damage micro-organisms in the water. The electrical treatment unit may comprise electrodes in contact with flowing water. By sufficiently high, it is meant that the frequency is high enough to provide a physical effect on the micro organisms. For example, a frequency of at least 50 Hz may be used, preferably a frequency of at least 500 Hz and more preferably at least 1 kHz. Preferably the frequency is sufficiently high to damage or weaken the cell walls, membranes or nuclei of the organisms.

The electrodes may be connected in 1-phase or 3-phase configurations. The applied frequency may be of a characteristic where the frequency alters, for example a sweeping frequency or noise pattern. Preferably a moderate voltage is used, for example for a 1-phase configuration a voltage of less than 120 volts may be used. Avoiding high voltages avoids the risk of electrocution and other hazards associated with high voltages.

The methods of the various aspects described above may, in preferred embodiments include method features corresponding to the preferred apparatus features discussed above. The method may be for the treatment of ballast water, and the method preferably comprises: treating the water used to fill the ballast tank in accordance with any aspect or preferred embodiment set out above, optionally injecting nitrogen into the water, storing the treated water in the ballast tank, discharging the water from the tank, optionally treating the discharged water by injecting an oxygen containing gas, optionally applying a repeated micro-organism killing action to the water, and releasing the water to the environment.

By treating the water as it enters and leaves the tank the risk of storing and releasing undesirable matter, in particular micro-organisms and other organic matter, is greatly reduced, as the various treatment steps result in such matter being broken down to a non-hazardous state. The optional injection of nitrogen into water which is then stored reduces corrosion of the ballast tank by reducing the amount of dissolved oxygen in the water. In addition, this reduces weathering of corrosion protection systems such as coatings and paints as oxidation is a cause of such weathering.

Preferred embodiments of the invention will now be described by way of example only and with reference to the accompanying drawings in which.

Figure 5:
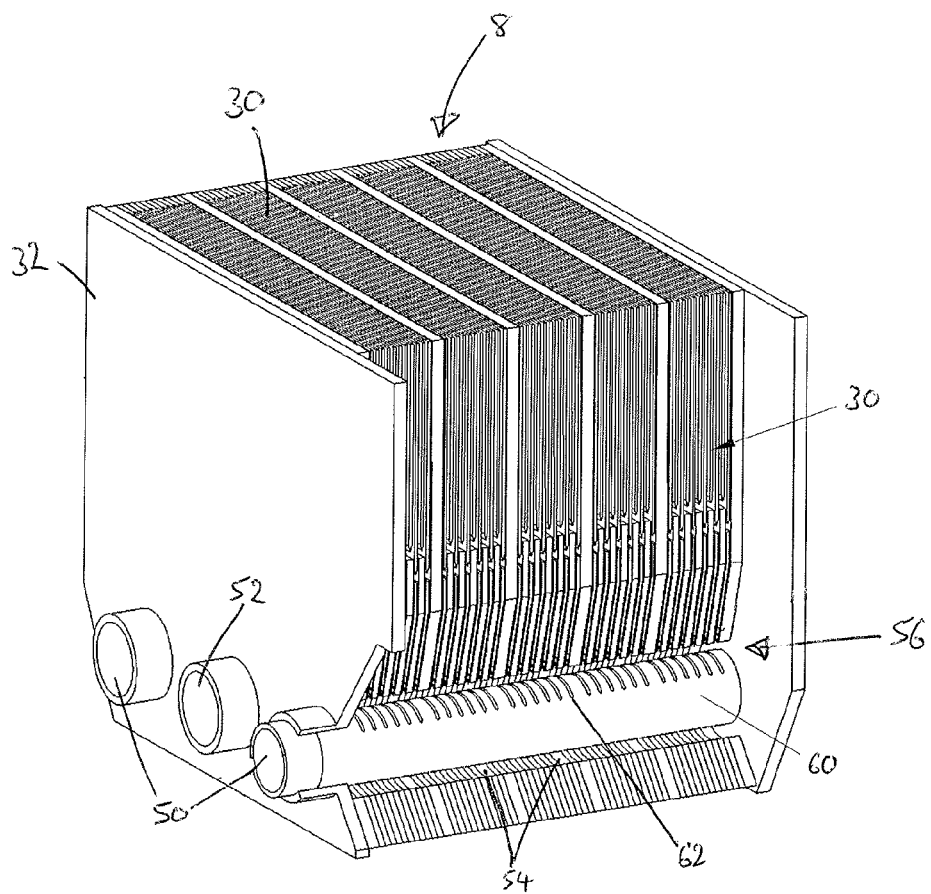
Figure 6:
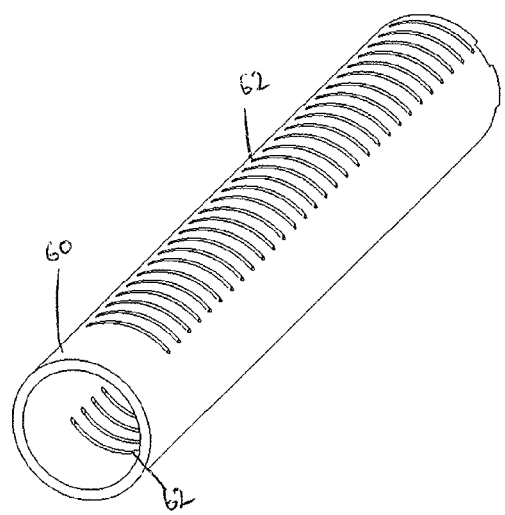
Figure 7A:
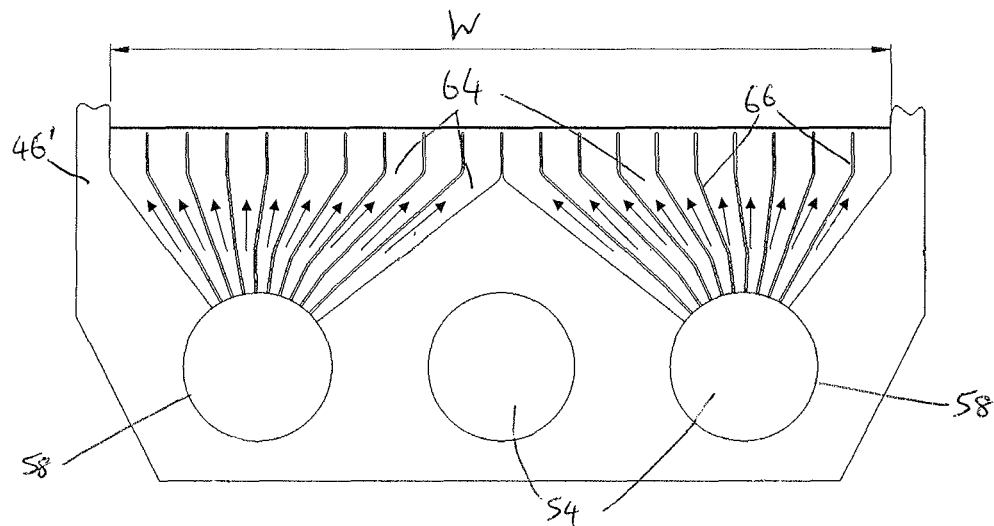
Figure 7B:
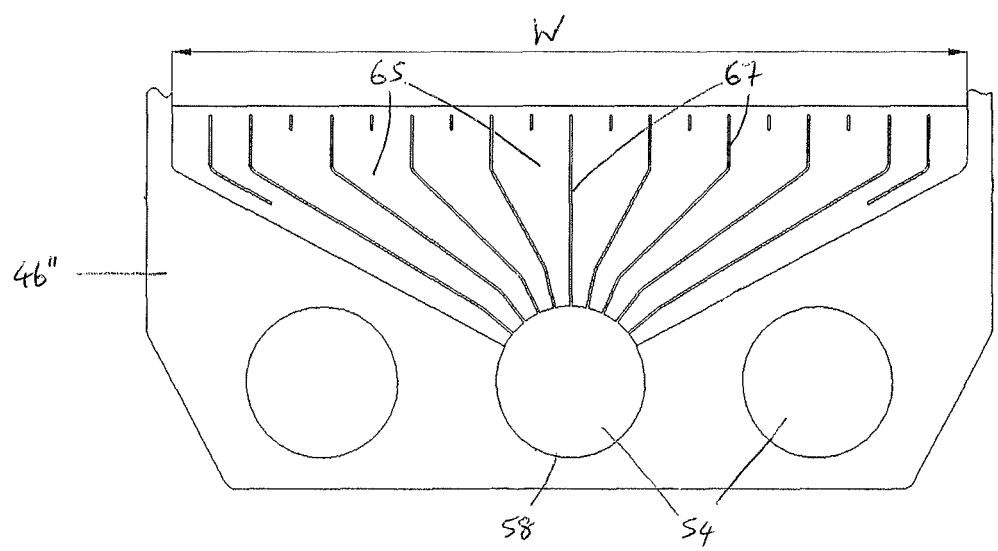
Figure 9:
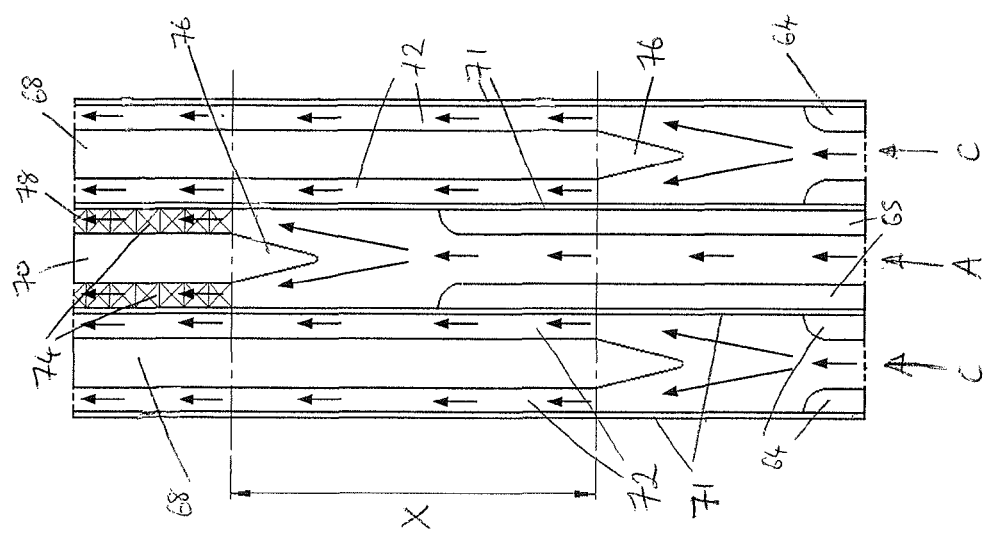
Figure 8:
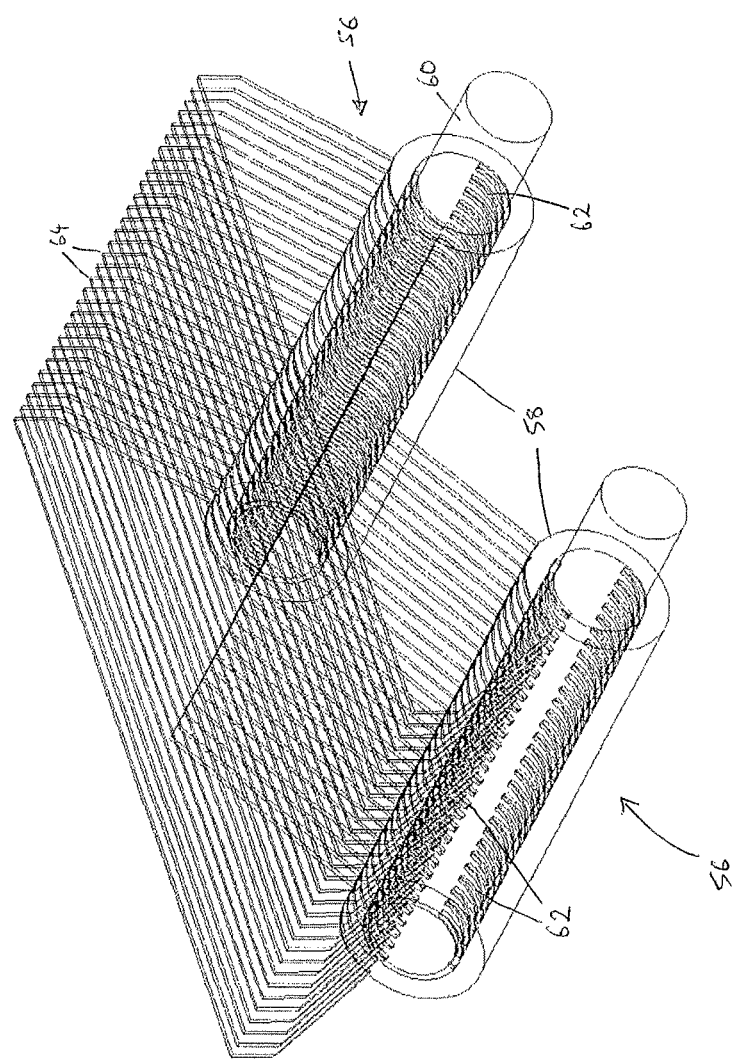
Figure 10:
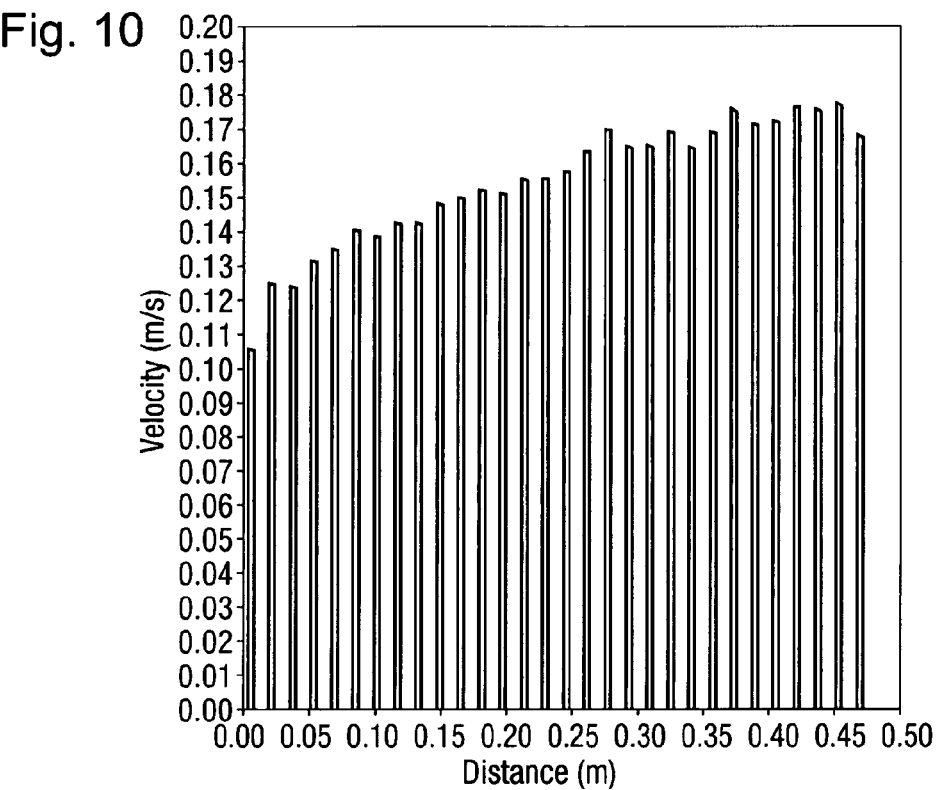
Figure 11:
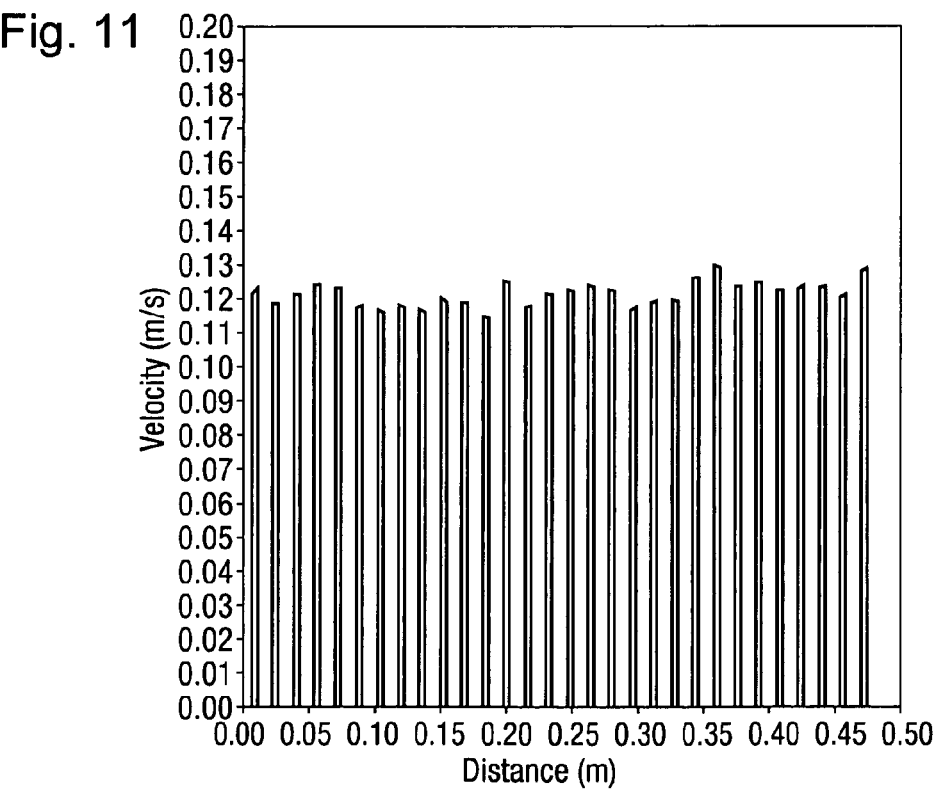
Figure 12:
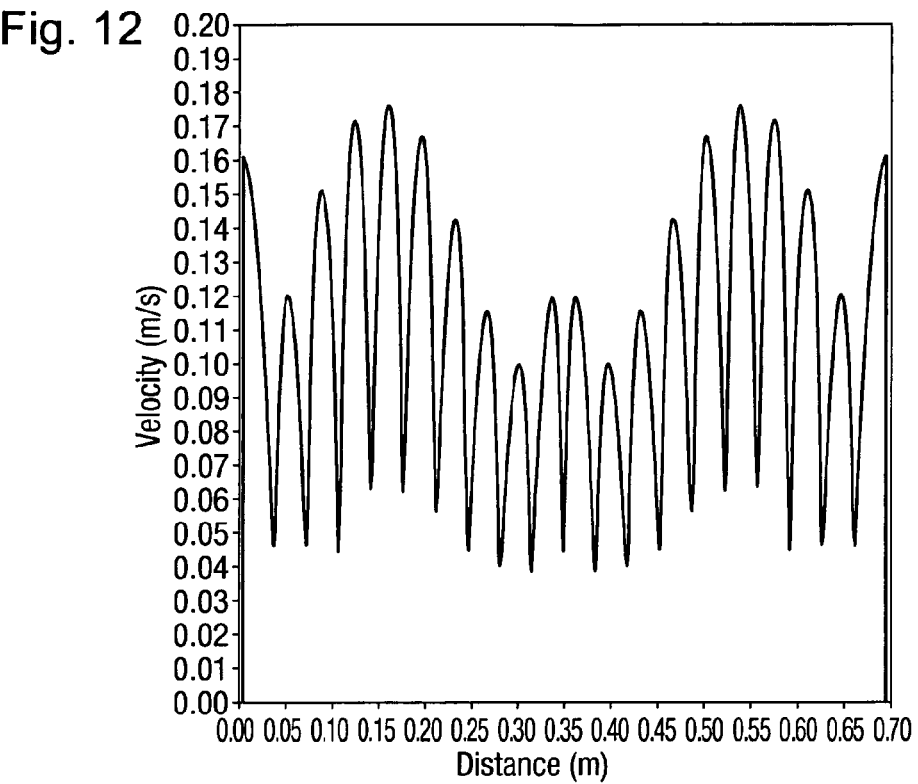
Figure 13:
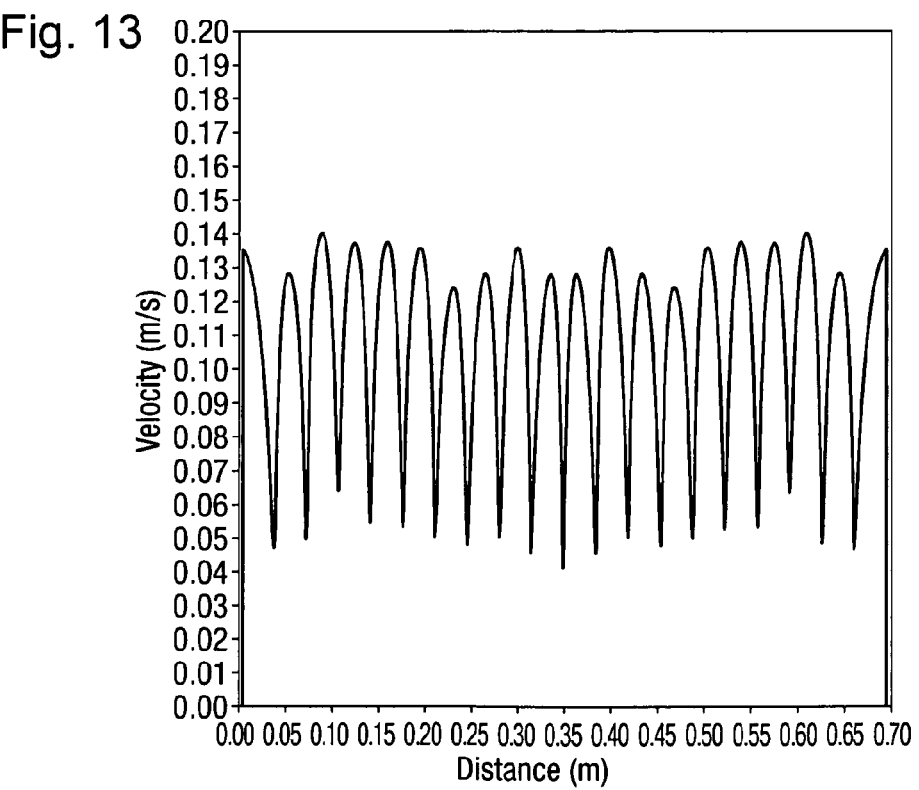

FIG. 5 is a partial cutaway view of an electrodialysis unit in which the flow distributor can be seen, FIG. 6 is a perspective view of the internal tube of the flow distributor, FIG. 7 is a partial view of a separator showing the flow conditioning elements, FIG. 8 is a schematic wireframe drawing showing further detail of the flow distributor and flow conditioning elements, FIG. 9 is a cross-section through a portion of two cathode chambers and one anode chamber showing the leading edges of the electrodes, FIG. 10 shows a plot of velocity across each of the cathode chambers along the electrode stack in a computer model when the preferred flow distributor is not used, FIG. 11 shows a plot of velocity across each of the cathode chambers along the electrode stack in a computer model when the preferred flow distributor is used, FIG. 12 shows a plot of velocity across the width of a cathode flow path in a computer model when the preferred flow conditioning elements are not used, and FIG. 13 shows a plot of velocity across the width of a cathode flow path in a computer model when the preferred flow conditioning elements are used.

Figure 1:
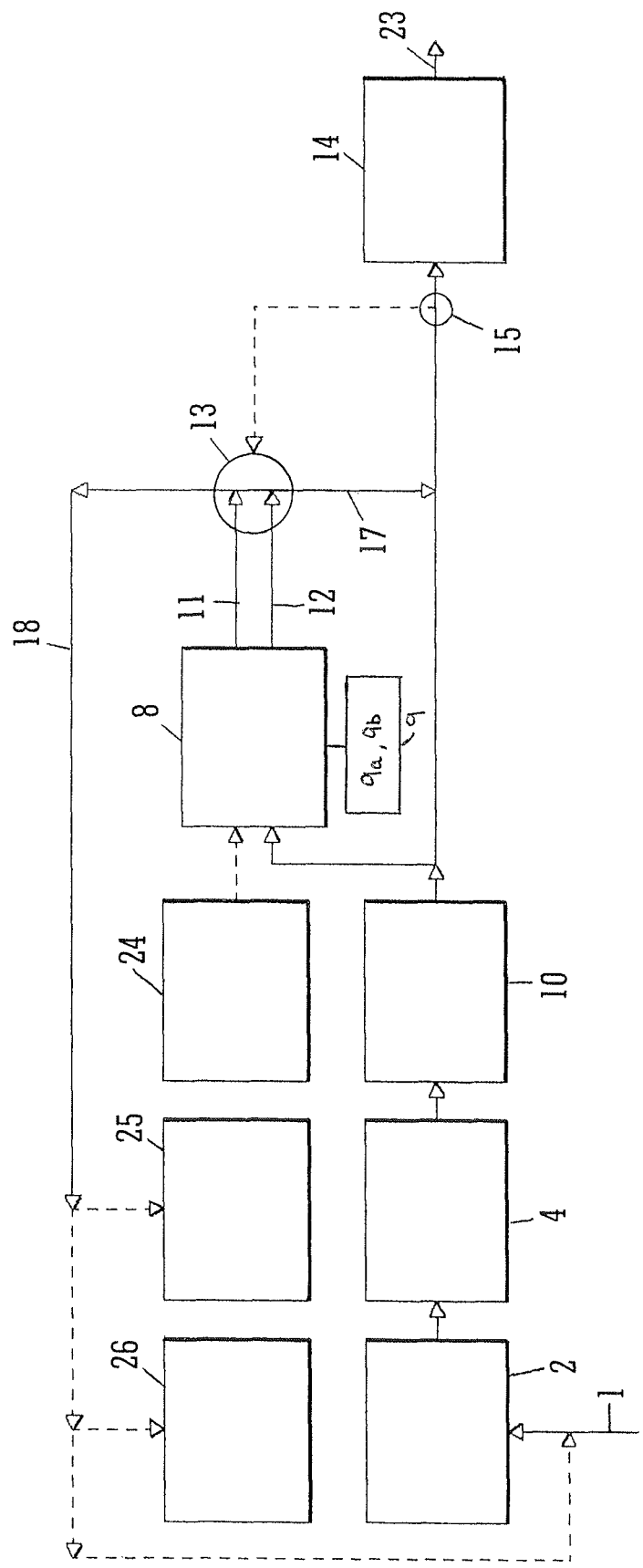
FIG. 1 shows a ballast water treatment system with an electrodialysis unit.

The arrangement of FIG. 1 utilises an electrodialysis unit within a ballast water treatment system, but it will be appreciated that other uses for the preferred electrodialysis unit exist, and that the electrodialysis unit can be adapted to suit different requirements. In particular, it should be understood that the electrodialysis unit described herein can be used in ballast water treatment, or in other water treatment applications, without the need for combination with other treatment types as shown in the exemplary arrangement of FIG. 1.

FIG. 1 thus illustrates a ballast water treatment system that includes an electrodialysis unit 8. In this example, the water is filtered and then treated by a cavitation unit 10, a gas injection unit 14 and the electrodialysis unit 8. This series of treatments causes damage and death to the organisms in the water. As well as affecting organisms in the water, nitrogen added to the water at the injection unit 14 reduces the level of dissolved oxygen in the water and reduces the potential of re-growth of organisms as well as reducing the weathering of coatings and the speed of corrosion. Furthermore, the reduction in oxygen is thought to prolong the effect of oxidants introduced into the water via the product of the electrodialysis unit 8. By controlled atmosphere management when the ballast tanks are empty by using nitrogen, these effects are enhanced further.

During filling of the ballast tanks, ballast water is pumped from the sea through an inlet pipe 1 by the use of the ship's ballast pump system 2. After the pump 2, water flows through a pipe and is filtered through a first filter 4, which filters larger particles from the water. These form a sludge which is discharged at the point of ballast uptake.

Downstream of the first filter 4, a pressure booster may optionally be installed. The pressure booster can be used to maintain the level of water pressure needed for successful treatment in the units further downstream.

In this example, water then continues to flow into the cavitation unit 10. In the cavitation unit 10 hydrodynamic cavitation is induced by a rapid acceleration of the fluid flow velocity, which allows the fluid static pressure to rapidly drop to the fluid vapour pressure. This then leads to the development of vapour bubbles. After a controlled period of time which allows bubble growth, a rapid controlled deceleration then follows. This causes the fluid static pressure to rise rapidly which causes the vapour bubbles to violently collapse or implode exposing any organisms or the like in the water to the high intensity pressure and temperature pulses, which breaks down the organisms in the water.

After the cavitation unit 10, a part of the water flows through the electrodialysis unit 8. The remainder of the water is not treated by the electrodialysis unit 8, and can simply continue to flow along a pipe or conduit to the later treatment stages. In the embodiment of FIG. 1 the electrodialysis unit is fitted externally to the main flow conduit, and thus could be retro-fitted to an existing treatment system.

In an alternative embodiment, instead of or in addition to the treatment of incoming ballast water by the electrodialysis unit 8, another source of brine or saltwater 24 can be used as the input electrolyte for the electrodialysis unit 8. This could, for example, be brine produced as a by-product in a ship's freshwater production.

The electrodialysis unit 8 of the preferred embodiment is provided with a temperature control system 9. This is used to ensure that the water utilised by the electrodialysis unit 8 does not drop below a set temperature. The temperature control system 9 includes a temperature monitoring device 9a for monitoring the temperature of incoming water and a heater 9b for increasing the temperature of the incoming water before it reaches the membrane cell of the electrodialysis unit 8. The heater 9b is arranged to operate to increase the temperature of the incoming water when the original water temperature is below a predetermined level. In this embodiment the predetermined level is 16° C. If the temperature of the incoming water is below 16° C. then the water is heated up to about 20° C. using the heater. The heater 9b uses waste heat from the ship's engines.

The electrodialysis unit 8, which is described in more detail below with reference to FIGS. 2 to 9, produces a diluate stream 11 and a concentrate stream 12. These two streams progress to a pH balancer or mixing unit 13, which produces a product 17 of the electrodialysis unit 8 that is directed back into the main water flow, and depending on the composition of the product 17, the mixing unit 13 may also give out a residue of diluate 18. The mixing unit 13 includes a pump or the like to control the amount of diluate 11 which is added to the concentrate 12 to form the optimum product 17 of the electrodialysis unit 8.

Downstream of the point of injection of the product 17 of the electrodialysis unit 8 there is a sampling and measurement point 15, which measures ORP and/or TRO and communicates the measured values to the mixing unit 13. These measurements monitor the effect of the electrodialysis unit 8 on the water and are used to control the mixing unit 13, for example by controlling a dosing pump.

The diluate residue 18 may be reinjected into the incoming water prior to all treatment steps, and preferably also before the filter 4 and/or the ballast water pump 2. Alternatively, it may be stored in a holding tank 25 or ship's bilge water tank 26.

In the arrangement shown, the gas injection unit 14 treats the water after the product 17 of the electrodialysis unit 8 is returned to the main flow. However, in alternative arrangements the product 17 is returned to the main flow downstream of the gas injection unit 14, with the monitoring unit 15 likewise downstream of the gas injection unit 14, monitoring the water conditions after the product 17 has been mixed in.

In the gas injection unit 14, nitrogen gas 16 is injected into the incoming water using a steam/nitrogen injector or a gas/water mixer in order to achieve the desired level of nitrogen super-saturation in the water, which kills organisms and reduces corrosion by reducing the oxygen level. This also prolongs the treatment effect of the oxidants in the water.

Downstream of the treatment units, treated water is distributed by the ship's ballast water piping system 23 to ballast water tanks. Here, excess gas is evacuated until a stable condition is achieved. This is regulated by means of valves integrated with the tanks ventilation system. These valves ensure stable conditions in the tank during the period the ballast water remains in the tank, in particular a high level of nitrogen super-saturation and a low level of dissolved oxygen in the water. Maintaining the level of super-saturation leads to an ongoing water treatment both by the super-saturation itself and also by oxidants introduced by the electrodialysis unit 8. The treatment thus results in treated water that continues to kill or disable any surviving organisms whilst the water is stored in the ballast tanks.

Water is then left to rest in the ballast water tanks. When the ballast water is discharged, water flows through a discharge treatment process that returns the oxygen content of the water to an environmentally acceptable level for discharge. The water is pumped from the ballast tanks and passes through at least the gas injection unit 14. This is used to return oxygen to the water as air replaces nitrogen as the injection gas. Optionally, the water may be re-treated by the cavitation unit 10 as it is discharged.

The operation of the electrodialysis unit 8 will now be explained. An embodiment of the structural arrangement of electrodialysis unit 8 is described below with reference to FIGS. 2 to 9. As discussed above, electrodialysis is an electro-membrane process where ions are transported through ion exchange membranes in a fluid system. In the simplest implementation of an electrodialysis unit a single membrane is placed between two electrodes. An electric charge established by applying a voltage between two electrodes allows ions to be driven through the membrane provided the fluid is conductive. The voltage is applied by power connection points of a conventional type, which are not shown in the drawings. The two electrodes represent respectively the anode and the cathode. The electric charge creates different reactions at the different electrodes. At the anode, the electrolyte will have an acidic characteristic whilst at the cathode, the electrolyte will be characterised by becoming alkaline. Membranes used in electrodialysis are chosen for the ability to allow ion exchange whilst being liquid impermeable. This allows the alkaline solution to be kept separate from the acidic solution.

Various reactions which occur in an electrodialysis membrane cell where the incoming electrolyte is ballast water taken from a ballast water pipeline (i.e. sea water) are shown in Table 1 below. This includes a reaction on the cathode side that produces brucite ($Mg(OH)_2$). Other reactions will also occur since various compounds may be present in the water in addition to sodium and magnesium salts.

TABLE 1

| Reactions at the anode: | Reactions at the cathode: |
| --- | --- |
| $2Cl^- - 2e \rightarrow Cl_2$ | $2H_2O + 2Na^+ + 2e \rightarrow 2NaOH + H_2$ |
| $2H_2O - 4e \rightarrow 4H^+ + O_2$ | $2H_2O + 2e \rightarrow H_2 + 2OH^-$ |
| $Cl_2 + H_2O \rightarrow HClO + HCl$ | $O_2 + e \rightarrow O_2^-$ |
| $HCl + NaOH \rightarrow NaCl + H2$ | $O_2^- + H^+ \rightarrow HO_2$ |
| $Cl^- + 2OH^- - 2e \rightarrow ClO^- + H_2O$ | $O_2 + H_2O + 2e \rightarrow HO_2^- + OH^-$ |
| $3OH^- - 2e \rightarrow HO_2^- + H_2O$ | $O_2 + 2H_2 + 2e \rightarrow H_2O_2 + 2OH^-$ |
| $HO_2^- - e \rightarrow HO_2$ | $H^+ + e \rightarrow H^\bullet$ |
| $OH^- - e \rightarrow OH^\bullet$ | $H^\bullet + H^\bullet \rightarrow H_2$ |
| $OH^\bullet + OH^\bullet \rightarrow H_2O_2$ | $OH^\bullet + OH^\bullet \rightarrow H_2O_2$ |
| $HClO + H_2O_2 \rightarrow HCl + O_2 + H_2O$ | $H_2O_2 + OH^\bullet \rightarrow HO_2 + H_2O$ |
| $ClO^- + H_2O_2 \rightarrow {}^1O_2 + Cl^\bullet + H_2O$ | $H_2O_2 \leftrightarrow H^+ + HO_2^-$ |
| | $H_2O_2 + OH^- \leftrightarrow HO_2^- + H_2O$ |
| | $OH^- + HO_2^- \leftrightarrow O_2^{2-} + H_2O$ |

TABLE 1-continued

| Reactions at the anode: | Reactions at the cathode: |
|---|---|
| | $O_2^{2-} + H_2O_2 \rightarrow O_2^- + OH^- + OH$ |
| | $OH + H_2O_2 \rightarrow H_2O$ |
| | $OH^- + HCO_3^- + Ca^{2+} = CaCO_3 + H_2O$ |
| | $2OH^- + Mg^{2+} = Mg(OH)_2$ |

Table 2 below illustrates typical properties for an acidic solution produced at the anode and an alkaline solution produced at the cathode. The acidic solution forms the concentrate stream and the alkaline solution forms the diluate stream.

TABLE 2

| | pH | TRO (mg Cl/L) | ORP (mV) |
|---|---|---|---|
| Acidic solution (at the anode) | 2-4 | 400-1200 | 1100-1200 |
| Alkaline solution (at the cathode) | 11-14 | — | 800-900 |

The two separated streams are mixed in a ratio providing a product of the electrodialysis unit and optionally a residue with typical characteristics shown in Table 3. The product is mainly concentrate from the anode, possibly with the addition of diluate to control the pH level. The residue will be formed of any diluate that is not mixed in to the product. Typically the pH of the product in preferred implementations of the electrodialysis treatment is between 4-6, but treatment of the water will also occur within the broader pH range given below.

TABLE 3

| | pH | TRO (mg Cl/L) | ORP (mV) |
|---|---|---|---|
| Product | 2-8.5 | 400-1000 | 750-800 |
| Residue | 8.5-14 | | 800-900 |

In order to tailor the chemical characteristics of the two streams, cross-treatment may be applied. This may constitute of an arrangement allowing all of or a portion of one or both streams to be re-injected at the entrance to the opposite compartment from which it arrived from. Thus, the concentrate stream produced by the anode could be cross-treated by re-injection into the cathode side of the electrodialysis unit. The characteristics of the stream (s) expressed by pH, ORP and TRO may be further tailored by this method and enable the amount of residual diluate after mixing to be reduced if mixing is applied in addition.

The mixing ratio will depend on the "quality" of the raw electrolyte, the size of the electrodes and the power applied.

The product of the electrodialysis unit enters the ballast water flow in conjunction with the point of injection of the $N_2$, preferably immediately behind, and thus is introduced into the water in conjunction with the process of supersaturation/oxygen removal. The residue, if any, is injected upstream in the main flow immediately in front of the filter.

FIGS. 2 to 9 illustrate an embodiment of an electrodialysis unit 8 that can be used to treat water. The electrodialysis unit 8 may be used in the ballast water treatment system of FIG. 1 or in any other appropriate water treatment system. It can be used alone to provide a treatment effect, or alternatively it can be used in combination with other water treatment devices.

Figure 2:
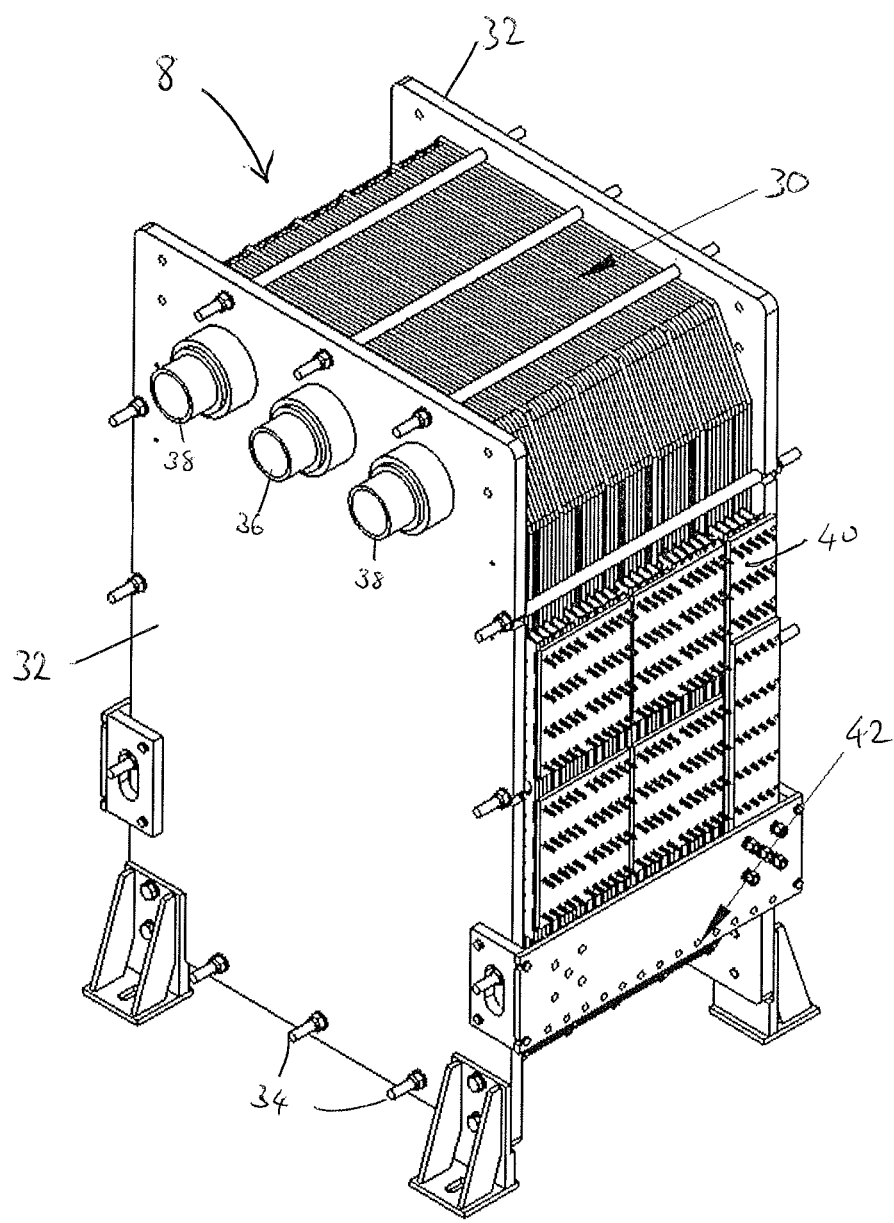
FIG. 2 illustrates an electrodialysis unit including a stack of electrodes.

FIG. 2 illustrates an electrodialysis unit 8 including a stack of electrode chambers 30 sandwiched between two end plates 32. The electrode stack is clamped between the end plates 32 by screws 34. The electrode chambers 30 are placed together in sets of ten membrane cells separated by insulating layers. The sets of electrode chambers 30 and plastic insulating layers can be seen more clearly in FIG. 5. The electrode chambers 30 are arranged in sets in this fashion to enable a series connection of multiple sets of chambers 30. Water enters the electrode stack via cathode water inlets 50 and an anode water inlet 52 at the base of the electrode chambers 30 and then flows upward through the anode and cathode chambers. The water inlets 50, 52 are at the reverse side of the electrodialysis unit 8 in FIG. 2, but can be seen in FIG. 5 in which the unit 8 is shown from the opposite side. The diluate stream 11 from the cathode reaction and the concentrate stream 12 from the anode reaction exit the electrode stack via a concentrate outlet 36 and diluate outlets 38. As discussed above, it is advantageous to have a higher flow rate on the cathode side and so the preferred embodiment includes two water inlet pipes for the cathode side and consequently two outlet pipes 38 for the diluate, with only one concentrate outlet 36. Also shown in FIG. 2 are exposed ends 40 of the electrodes and the electrical connection board 42 for the electrical supply to the electrodes.

Figure 3:
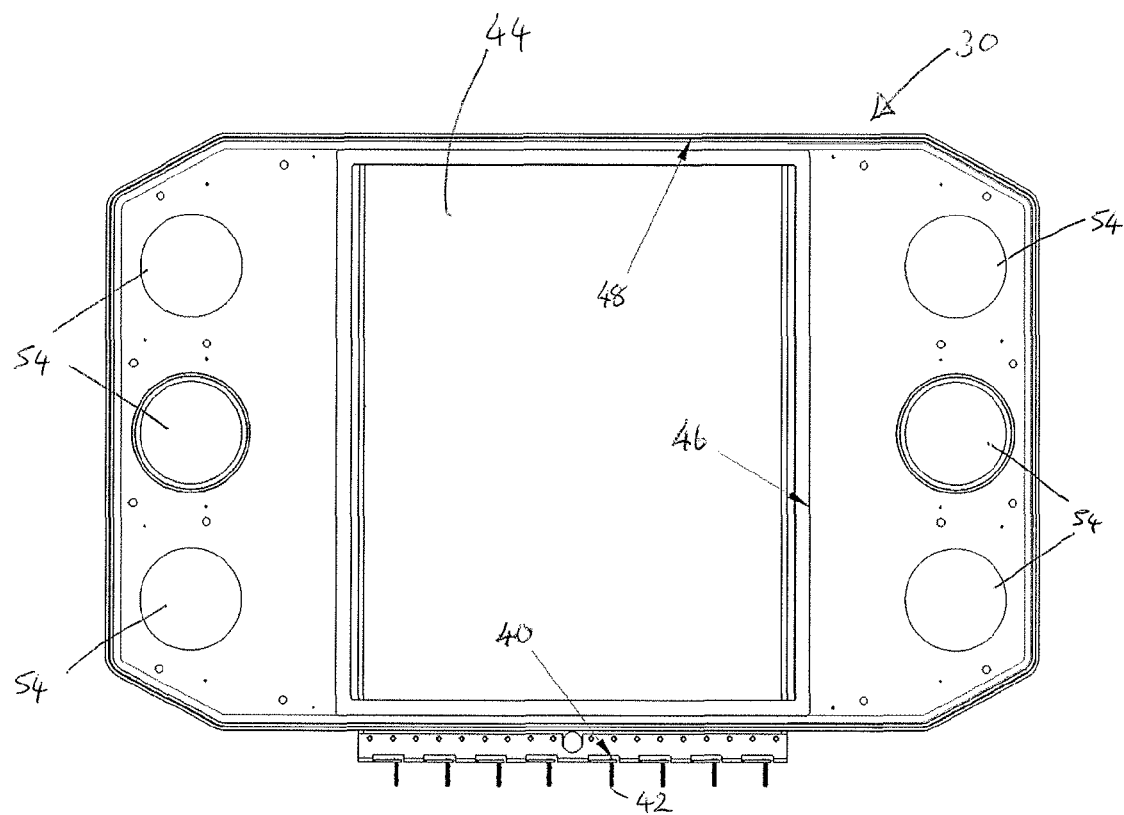
FIG. 3 shows a single electrode chamber as used in the unit of FIG. 2.

FIG. 3 shows a single electrode chamber 30. The unit 8 of FIG. 2 consists of a large number of these electrode chambers 30 stacked together. The electrode chamber 30 includes a titanium electrode plate 44 supported by and within two separators 46, which are placed one on either side of the electrode 44. A rubber seal 48 extends around the outer edge of the separators 46 and provides a water tight barrier enclosing the electrode chamber 30. The exposed ends 40 of the electrodes extend beyond the rubber seal 48 so that the electrical connections 42 can be made outside of the reaction zone.

Water enters the electrode chamber 30 via through holes 54 at one end and exits via through holes 54 at the other end. The through holes 54 are in fluid communication with the corresponding water inlets 50, 52 and water outlets 36, 38. Each separator 46 has through holes 54 for each of the three inlets 50, 52 and outlets 36, 38. Within the electrode chamber 30 the separators 46 are provided with flow guides for passage of water from the appropriate water inlet to the appropriate water outlet. Thus, the cathode electrode chamber will have flow guides to take water from the cathode water inlets 50 via the two outer through holes 54 at the inlet side, direct it to pass across the cathode, and then pass the diluate from the cathode reaction via further flow guides to the outer through holes 54 on the outlet side and hence to the diluate outlets 38. The anode electrode chamber will have flow guides to take water from the anode water inlet 52 via the central through hole 54 at the inlet side, direct it to pass across the anode, and then pass the concentrate from the anode reaction via further flow guides to the central through hole 54 on the outlet side and hence to the diluate outlet 36.

Figure 4:
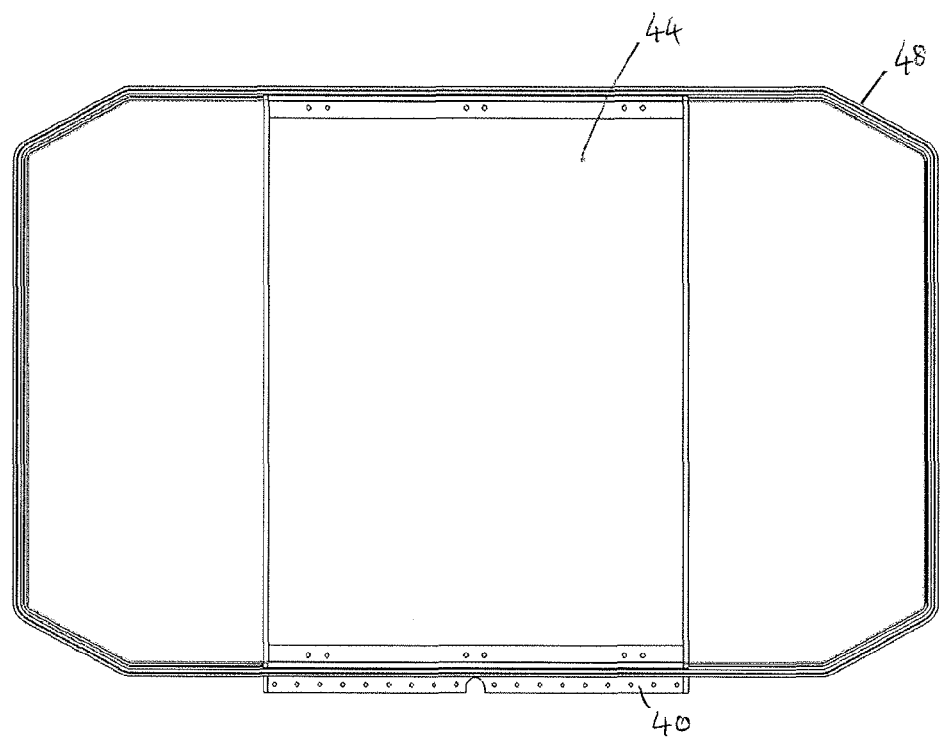
FIG. 4 shows an electrode plate and seal.

FIG. 4 shows an electrode plate 44 and seal 48 prior to attachment of the separators 46. The rubber seal 48 is bonded to the electrode plate 44 along two sides as shown in the Figure. The seal 48 is also on both front and back surfaces of the electrode plate 44. The exposed end 40 of the electrode plate 44 extends beyond the seal along one side of the electrode plate to permit electrical connection as set out above.

FIG. 5 is a partial cutaway view of an electrodialysis unit showing details of the flow distributor 56 for one of the cathode water inlets 52. FIG. 5 also more clearly shows the five sets of membrane cells separated by plastic insulating layers. The construction of the membrane cells is described in more detail below with reference to FIG. 9. In FIG. 5 one of the end plates 32 and each of the electrode chambers 30 are partially cut away to expose a circular passage formed by aligned through holes 54 (also partially cut away). This circular passage forms a first tube 58 of the flow distributor 56. The first tube 58 can be seen more clearly in the wireframe diagram of FIG. 8, which shows more detail of the fluid flow arrangement for the cathodes. The flow distributor 56 also includes a second tube 60, located concentrically within the through holes 54. In FIG. 5 this second tube 60 is inserted for one of the cathode inlets 50, but it is not shown for the other cathode inlet 50 or for the anode inlet 52. When the electrodialysis unit 8 is complete there is a second tube 60 in each water inlet, fitted concentrically with each set of through holes 54.

The second tube 60 includes holes 62 along its length. These holes 62 take the form of transverse slits cut on two sides of the second tube 60, and placed at the upper and lower sides of the second tube 60 when it is inserted in the first tube 58. FIG. 6 is a perspective view of the second tube 60 of the flow distributor 56 and shows further detail, including the holes 62 on the second, lower, side of the second tube 60.

Flow conditioning elements 64 on the separator 46' for the cathode chamber are shown in FIG. 7A, which is a partial view of the lower part of a cathode separator 46'. The flow conditioning elements 64 are for evenly distributing the flow across the width W of the cathode flow path.

The three through holes 54 would align with through holes 54 in other separators 46 in the electrode stack to form the first tubes 58 of the flow distributors. The second tubes 60, which are not shown in FIG. 7, would be inserted into the aligned through holes 54, with holes 62 in the second tubes 60 allowing water to pass into the first tubes 58. In FIG. 7A since the separator 46 is for the cathode chamber the outer through holes 54 would be open to the cathode flow paths whereas the central through hole 54 would be sealed to prevent water from the anode inlet 52 entering the cathode chamber. This sealing may be achieved by an O-ring seal placed about the central through hole. Holes would hence be formed in the first tubes 58 at the two outer through holes 54 to permit water to pass from the water inlets 50, along the tubes 60, 58 and then to the cathode reaction area via the flow conditioning elements 64.

The flow conditioning elements 64 take the form of channels extending away from the through holes 54 in a fan shape in order to distribute water evenly across the entire width W of the cathode flow path. The channels are recessed into the separator 46' and separated from each other by walls 66. When the two separators 46' that form the cathode chamber are joined together the walls 66 on each separator 46' face each other and come into contact so that the channels are sealed. Each channel has an end portion that is parallel with the flow direction through the cathode flow path. This helps reduce turbulence and promotes laminar flow.

FIG. 7B is a similar partial view of a separator 46" for the anode chamber. This anode separator includes flow conditioning elements 65 for the anode flow path. As with the cathode flow conditioning elements 64 the anode flow conditioning elements 65 take the form of channels extending away from the through hole 54 in a fan shape in order to distribute water evenly across the entire width W of the anode flow path. Since the anode flow path is supplied with water from only the single central through hole 54 the anode flow conditioning elements 65 fan out over a larger angle than the cathode flow conditioning elements 64. This allows water from flow distributor 56 in the central through hole 54 to be evenly distributed over the anode flow path. The two outer through holes would be sealed, e.g. by an O-ring seal, to prevent water ingress from the cathode water supply. The anode flow conditioning elements 65 are recessed channels divided by walls 67. The flow conditioning part of the anode separator 46" extends for a greater distance away from the through holes 54, since the leading edge of the anode is located at a greater distance from the water inlet, as discussed in more detail below with reference to FIG. 9.

FIG. 8 is a schematic wireframe drawing showing further detail of the flow distributor 56 and flow conditioning elements 64 for the cathode flow paths in the electrode stack. The detail of the flow conditioning elements 64 is omitted for clarity, but the fan shapes can be seen. Each cathode chamber has two symmetrical sets of flow conditioning elements 64 that join in similar fashion to two flow distributors 56 in the two outer through holes 54 of the separators 46. As discussed above, the through holes 54 are aligned to produce a first tube 58 of the flow distributor 56. The first tube 58 connects to each of the sets of flow conditioning elements 64 via holes on an upper side. A second tube 60 located concentrically within the first tube 58 supplies water to the first tube 58 from the two cathode inlets 50. Water passes between the first tube 58 and the second tube 60 via slit shaped holes 62 in upper and lower surfaces of the second tube.

The two tube flow distributor 56 acts to distribute water equally to each cathode chamber along the length of the electrode stack 30. The flow conditioning elements 64 provide even distribution of the water across the width W of each cathode flow path, and also promote laminar flow in the cathode flow paths.

For the anode chamber there is an arrangement similar to that shown in FIG. 8, but with water being distributed from only the central through hole 54 instead of from the two outer holes 54. The anode water flow path passes through a flow distributor 56 of identical design to the flow distributor 56 described above, using first and second tubes 58, 60. This flow distributor 56 would be formed using a first tube 58 created by the aligned central through holes 54 that connect to the anode water inlet 52.

After the incoming water passes through the flow distributors 56 and exits the flow conditioning elements 64, 65 it flows into the cathode and anode flow paths within the cathode and anode chambers. At this point, as explained below with reference to FIGS. 10 to 13, the water is equally distributed to each flow path along the electrode stack and evenly distributed across the width W of each flow path. The equal distribution of the water ensures an equal rate of reaction across each membrane cell in the electrode stack. The even distribution of water across each flow path width W means that the reaction occurs evenly over the width of the electrodes, and also promotes laminar flow in the cathode flow paths.

FIG. 9 is a cross-section through a portion of two cathodes 68 and one anode 70 at the point where water enters the cathode chambers and electrode chamber. A membrane 71 is located between the electrodes to form the membrane cells. The Figure shows a partial cross-section through two complete membrane cells (one either side of the anode 70) and two partial membrane cells (at the outside portions of the two cathodes 68).

FIG. 9 illustrates further features used to promote laminar flow through the electrode chambers, especially in the reaction zone of the cathode flow path. Incoming water for the cathode flow paths 72 arrives from the flow conditioning elements 64 of the separators 46' as indicated by the arrow C. Water for the anode flow paths 74 arrives from the flow conditioning elements 65 as indicated by the arrow A. The water flow through the flow conditioning elements 64, 65 supplies two flow paths 72, 74 that pass along each of the two sides of the respective cathode 68 or anode 70.

The water exiting the flow conditioning elements 64, 65 is allowed to flow a fixed distance where the flow is undisturbed before the flow is divided gently into two equal flows that enter the flow paths 72, 74 on either side of the electrodes. This fixed distance helps the flow to recover from any disruptive effects that may have arisen from the previous flow guides. A gentle division of the flow is achieved through the shape of the electrode leading edge 76, which is wedge-shaped to minimise turbulence. The fixed distance of undisturbed flow in the preferred embodiment is around 10 mm.

It will be noted that the leading edge 76 of the anode 70 is placed at a larger distance away from the water inlet than the leading edge 76 of the cathode 68. The electrodialysis unit is designed such that water flows an additional fixed distance X over the cathode before being subjected to electrical treatment in the reaction zone. This further distance X allows any residual turbulence to dissipate and helps the flow to develop into a laminar flow before the seawater is subjected to any electrical current. This is achieved through the use of different lengths of anode 70 and cathode 68 which permits an offset cathode/anode configuration. In the preferred design shown herein this fixed distance X is around 30 mm with a gap of 2 mm between cathode 68 and membrane. The reaction zone begins when both the anode 70 and cathode 68 are present in sufficient proximity, in this case this will be after the distance X as marked on the Figure. In the reaction zone electrodialysis occurs and as the water passes along the anode flow paths 74 and cathode flow paths 72 in the reaction zone ion exchange occurs across the membranes 71, generating an acidic concentrate on the anode side and alkaline diluate on the cathode side as described above. The concentrate and diluate exit the electrodialysis unit via outlets 36, 38 and are used to treat water by mixing the concentrate with some or all of the diluate to provide a product of the electrodialysis unit, which is harmful to micro organisms.

On each side of the anode 70 a spacer element 78 is included in the anode flow paths 74. To avoid turbulence there are no spacer elements on the cathode flow paths 72. In the cathode flow paths 72 conditioned flow is provided by the flow conditioning elements 64. This flow becomes more laminar as it passes across the 10 mm region of undisturbed flow, after which it is divided by the wedge shaped end 76 of the cathode 68. The water then flows along two cathode flow paths 72 for a further distance of 30 mm, which acts to further promote laminar flow. By the time the incoming water enters the reaction zone in the cathode flow paths 72 the flow is generally laminar. As discussed above, this laminar flow avoids the build-up of brucite deposits and also helps avoid build-up of other contaminants.

As discussed above, the preferred electrodialysis unit is made up of several sets of membrane cells, with each set of cells being formed by five anodes and six cathodes, with cathodes being placed at the outer ends. With this arrangement the outer cathodes would only have one active side, with one flow path along the inner side of the cathodes. The outer surfaces of the outer cathodes would not be active and would be blocked to prevent water flowing.

Computer modelling has been used to illustrate the advantageous effects of the preferred embodiment.

FIGS. 10 and 11 show the effect of the two tube flow distributor system. FIG. 10 shows a plot of velocity across each of the cathode chambers along the electrode stack in a computer model when the preferred flow distributor 56 is not used, whereas FIG. 11 shows a plot of velocity across each of the cathode chambers along the electrode stack in a computer model when the preferred flow distributor 56 is used. The plots show flow velocity on the vertical axis with the horizontal axis showing the distance of the cathode flow path 72 from the cathode water inlet 50 at the end of the electrode stack. As can be seen by a comparison of the Figures when the flow distributor 56 is not used there is a considerably higher velocity in the cathode flow paths 72 at greater distances from the water inlet 50. When the flow distributor 56 is used the water is significantly more evenly distributed along the length of the electrode stack.

FIGS. 12 and 13 show the effect of the flow conditioning elements 64 on water flow across the cathode flow paths 72. FIG. 12 shows a plot of velocity across the width of a cathode flow path in a computer model when the preferred flow conditioning elements 64 are not included, and the water instead passes through a fan shaped region without the channels 64 or walls 66. FIG. 13 shows a plot of velocity across the width of a cathode flow path in a computer model when the preferred flow conditioning elements 64 are present. The vertical axis shows flow velocity and the horizontal axis shows the distance across the width of a cathode flow path 72. The peaks in each plot illustrate the likely velocity at points across the width W of the cathode flow path 72. The sharp troughs are due to the effect of the flow conditioning elements at the exit of the chamber which soon dissipate away. As can be seen, when the average flow across the chamber is studied, the channels 64 and walls 66 provide for a more even distribution of velocity and thus flow across the width W of the cathode flow path 72. When they are not present the velocity and thus flow is less even and this would lead to turbulence and secondary flows in subsequent parts of the cathode flow path 72.

The invention claimed is:

1. An electrodialysis unit comprising:
a plurality of cathodes, a plurality of anodes and a plurality of membranes;
wherein the cathodes and anodes are arranged alternately in an electrode stack, with a membrane in between each cathode and anode; and
wherein the cathode and the anode are each formed of a single conductive plate such that both surfaces of the cathode plates and anode plates enclosed within the electrode stack are, in use, in conductive contact with the water being treated,
wherein the conductive plates that form electrodes are clamped between and supported by non-conductive separators for separating the fluid flow into and out of the cathode flow paths and anode flow paths; and
wherein the conductive plates are each provided with a seal that is bonded to a portion of the conductive plate and forms a shape corresponding to the shape of the outer edge of the separators, wherein the seal is bonded to two opposite sides of the conductive plate and not bonded to two other opposite sides of the conductive plate, and wherein the seal contacts the separators on either side of the conductive plate in order to form an enclosed electrode chamber around the conductive plate.

2. An electrodialysis unit as claimed in claim 1, wherein the electrode stack comprises multiple sets of electrodes forming multiple membrane cells, wherein each electrode in a single set is electrically connected in parallel, wherein each set of electrodes is electrically connected in series.

3. An electrodialysis unit as claimed in claim 1, wherein the electrical connections for the electrodes are made directly to the conductive material of the conductive plates.

4. An electrodialysis unit as claimed in claim 1, wherein the conductive plates extend outside of the reaction area of the electrodialysis unit to provide electrical connection points.

5. An electrodialysis unit as claimed in claim 1, wherein the separators include openings exposing the conductive plates in the reaction zones, and wherein the membranes are placed across these openings between the anode and the cathode to complete membrane cells.

6. An electrodialysis unit as claimed in claim 1, wherein the separators include inlet flow passages for incoming water and outlet flow passages for outgoing diluate and concentrate.

7. An electrodialysis unit as claimed in claim 1, wherein the separators include flow guide features for providing uniform and/or laminar flow to cathode and/or anode flow paths.

8. An electrodialysis unit as claimed in claim 7 wherein alternate cathode and anode separators comprise different flow guide features and/or provide for different flow rates for the cathode and the anode flow paths.

9. An electrodialysis unit as claimed in claim 8, wherein different separator designs support the anode and cathode plates at different positions when assembled in the electrode stack.

10. An electrodialysis unit as claimed in claim 1, including cathode chambers comprising first and second cathode separators located on either side of the cathode in the form of a conductive plate and anode chambers comprising first and second anode separators located on either side of the anode in the form of a conductive plate, wherein the electrodialysis unit comprises a sequence of anode and cathode chambers, with membranes between each of the cathode and anode chambers.

11. An electrodialysis unit as claimed in claim 1, wherein the separators include through holes that align in the electrode stack to form water inlet and outlet passages.

12. An electrodialysis unit as claimed in claim 11, comprising two cathode inlet passages, one anode inlet passage, two cathode outlet passages and one anode outlet passage, each of about the same size in order to provide an increased flow rate through the cathode flow paths as compared with the flow rate through the anode flow paths.

13. An electrodialysis unit as claimed in claim 11, wherein seals are provided about the through holes to maintain separation of anode fluid and cathode fluids.

14. A method of manufacturing an electrodialysis unit comprising a plurality of cathodes, a plurality of anodes and a plurality of membranes; the method comprising:
arranging the cathodes and anodes alternately in an electrode stack, with membranes in between each cathode and anode;
wherein the cathode and the anode are each formed of a single conductive plate such that within the electrode stack both surfaces of the cathode plates and anode plates are, in use, in conductive contact with the water being treated;
wherein the conductive plates that form electrodes are clamped between and supported by non-conductive separators for separating the fluid flow into and out of the cathode flow paths and anode flow paths; and
wherein the conductive plates are each provided with a seal that is bonded to a portion of the conductive plate and forms a shape corresponding to the shape of the outer edge of the separators, wherein the seal is bonded to two opposite sides of the conductive plate and not bonded to two other opposite sides of the conductive plate, and wherein the seal contacts the separators on either side of the conductive plate in order to form an enclosed electrode chamber around the conductive plate.

15. A method as claimed in claim 14, wherein a thermosetting or vulcanising rubber is used for the seal, and the method comprises applying the rubber to the electrode prior to heat treatment, and then bonding the rubber to the electrode by performing a thermosetting or vulcanising process whilst it is in contact with the electrode.

16. A method as claimed in claim 14, wherein the method includes clamping each conductive plate and seal between non-conductive separators.

17. A method as claimed in claim 16, comprising providing openings in the separators exposing the conductive plates in the reaction zones and placing membranes across these openings between the anode and the cathode, such that the membranes are sandwiched between adjacent electrodes.

18. An electrodialysis unit as claimed in claim 2, wherein the electrodes at the outer ends of each set of electrodes in the electrode stack are both cathodes.

19. An electrodialysis unit as claimed in claim 18, wherein the seals comprises a thermosetting or vulcanising rubber bonded to the electrode by a thermosetting or vulcanising process.

20. An electrodialysis unit comprising:
a plurality of cathodes, a plurality of anodes and a plurality of membranes;
wherein the cathodes and anodes are arranged alternately in an electrode stack, with a membrane in between each cathode and anode; and
wherein the cathode and the anode are each formed of a single conductive plate such that both surfaces of the cathode plates and anode plates enclosed within the electrode stack are, in use, in conductive contact with the water being treated,
wherein the conductive plates that form electrodes are clamped between and supported by non-conductive separators for separating the fluid flow into and out of the cathode flow paths and anode flow paths;
wherein the separators include through holes that align in the electrode stack to form water inlet and outlet passages comprising two cathode inlet passages, one anode inlet passage, two cathode outlet passages, and one anode outlet passage, each of about the same size in order to provide an increased flow rate through the cathode flow paths as compared with the flow rate through the anode flow paths.

* * * * *